US012676415B2

(12) United States Patent
Patriotis et al.

(10) Patent No.: US 12,676,415 B2
(45) Date of Patent: Jul. 7, 2026

(54) DUAL-BAND ANTENNA

(71) Applicant: QUALCOMM Incorporated, San Diego, CA (US)

(72) Inventors: Marios Patriotis, San Diego, CA (US); Jorge Fabrega Sanchez, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 18/893,452

(22) Filed: Sep. 23, 2024

(65) Prior Publication Data

US 2026/0088510 A1 Mar. 26, 2026

(51) Int. Cl.

*H01Q 9/04* (2006.01)
*H01Q 1/48* (2006.01)
*H01Q 5/20* (2015.01)

(52) U.S. Cl.

CPC ............. *H01Q 9/0414* (2013.01); *H01Q 1/48* (2013.01); *H01Q 5/20* (2015.01)

(58) Field of Classification Search

CPC ........... H01Q 9/0414; H01Q 1/48; H01Q 5/20
See application file for complete search history.

(56) References Cited

U.S. PATENT DOCUMENTS

2013/0342409 A1* 12/2013 Tatarnikov ........... H01Q 9/0414 343/729
2018/0358701 A1 12/2018 Gimersky
2019/0267713 A1* 8/2019 Jeong ..................... H01Q 9/065
2021/0098894 A1* 4/2021 Haviv .................. H01Q 21/062

OTHER PUBLICATIONS

International Search Report and Written Opinion—PCT/US2025/044134—ISA/EPO—Nov. 21, 2025.
Kumar K.V.P., et al., “A Flexible Miniaturized Wideband Branch-Line Coupler Using Shunt Open-Stubs and Meandering Technique”, IEEE Access, IEEE, USA, vol. 9, Nov. 29, 2021, pp. 158241-158246, XP011891678, Sections I-III; abstract; figures 2,7.

* cited by examiner

*Primary Examiner* — Daniel Munoz
(74) *Attorney, Agent, or Firm* — Smith Tempel Blaha LLC/Qualcomm

(57) ABSTRACT

A dual-band antenna includes: first and second overlaying patch radiators configured to operate at first and second frequency bands and first and second polarizations that are orthogonal, wherein the first frequency band is lower than the second frequency band; a first ground plane between the patch radiators; a first energy coupler having a first signal path and a second signal path electrically coupled to a first coupling portion of the first patch radiator; a second energy coupler having a third signal path and a fourth signal path electrically coupled to a second coupling portion of the second patch radiator; and a conductive wall in electrical proximity to the first patch radiator, the first signal path, and the second signal path.

20 Claims, 14 Drawing Sheets

DUAL-BAND ANTENNA

BACKGROUND

Non-terrestrial networks (NTN) are wireless communication systems that operate above the surface of the Earth. At present, there is a desire to connect Internet-of-Things (IoT) devices to existing and future satellite systems. Known systems for these applications generally include dual-band communication devices that utilize two different size patch antennas that are located adjacent to each other within either the same, or adjacent, substrate(s) that have oppositely tilted slots within the different patch antennas to generate opposite circular polarizations. Other approaches include utilizing a single substrate with two circular or spiral slot antennas superimposed on the substrate where each slot antenna has a circular or spiral slot at a ground plane driven by a microstrip line. These approaches have corresponding limitations that include having too large a physical structure for the low band antennas and/or electrical coupling between the antennas that affects the frequency performance of each individual antenna band.

Other approaches have also included utilizing two different sized patch antennas in a stack up manner where circular polarization is produced by truncating the corners of each patch antenna, but this generally leads to a single tone design or designs with narrow bandwidth and strong cross-talk.

SUMMARY

An example dual-band antenna includes: a first patch radiator configured to operate at a first frequency band and a first polarization; a second patch radiator configured to operate at a second frequency band and a second polarization that is orthogonal to the first polarization, wherein the second patch radiator overlays the first patch radiator in a stack up configuration and the first frequency band is a lower frequency band than the second frequency band; a first ground plane positioned between the first patch radiator and the second patch radiator within the stack up configuration; a first energy coupler having a first signal path and a second signal path, wherein both the first signal path and the second signal path are electrically coupled to a first coupling portion of the first patch radiator; a second energy coupler having a third signal path and a fourth signal path, wherein both the third signal path and the fourth signal path are electrically coupled to a second coupling portion of the second patch radiator; and a conductive wall along the stack up configuration, wherein the conductive wall is in electrical proximity to the first patch radiator, the first signal path, and the second signal path.

Another example dual-band antenna includes: a first patch radiator configured to operate at a first frequency band and a first polarization; a second patch radiator configured to operate at a second frequency band and a second polarization that is orthogonal to the first polarization, wherein the second patch radiator overlays the first patch radiator in a stack up configuration and the first frequency band is lower than the second frequency band; means for lowering cross-talk between the first patch radiator and the second patch radiator within the stack up configuration; means for exciting the first patch radiator at the first frequency band and the first polarization; means for exciting the second patch radiator at the second frequency band and the second polarization; and means for lowering the first frequency band of the first patch radiator.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

DETAILED DESCRIPTION

Figure 1:
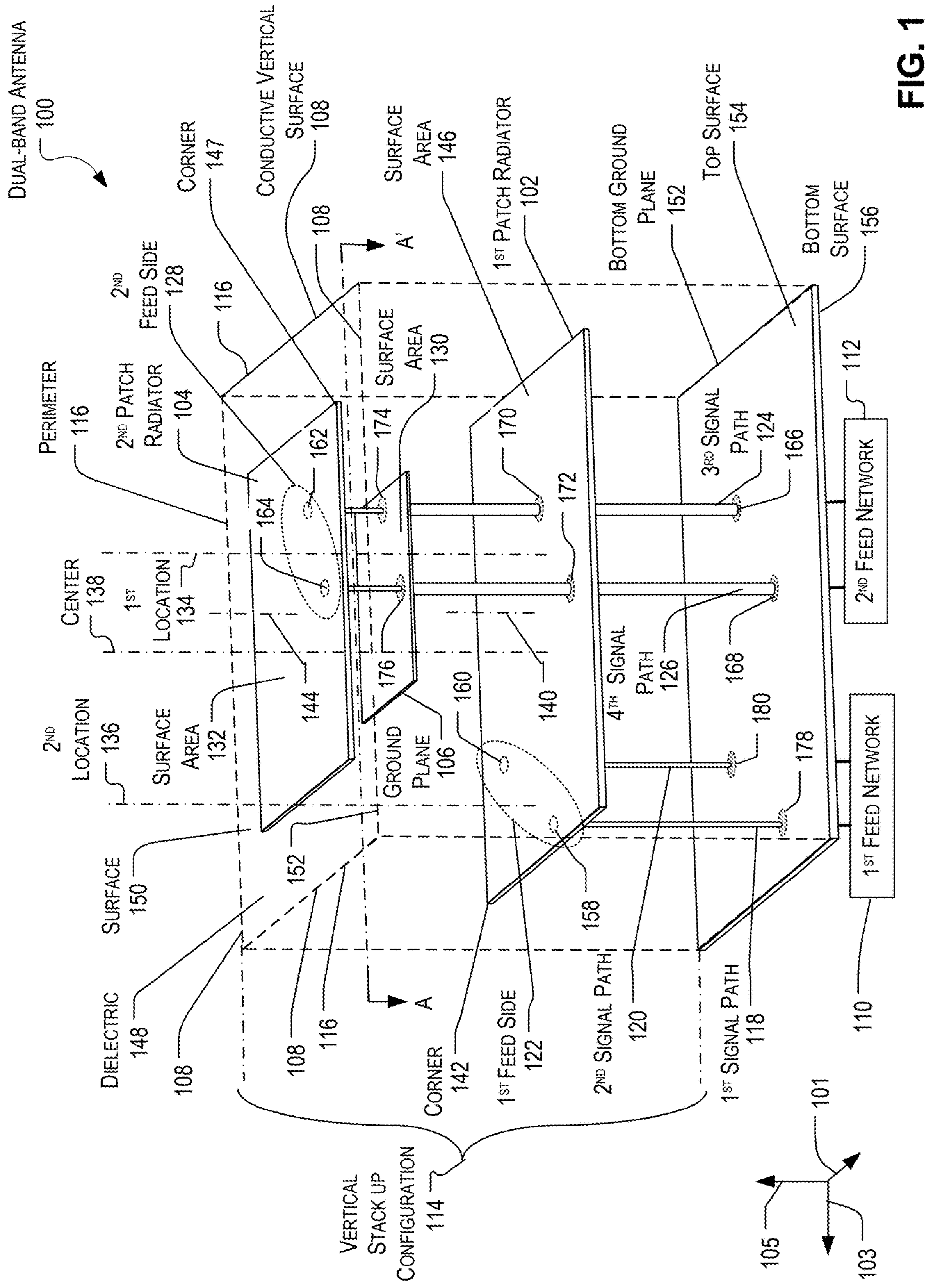
FIG. 1 is an isometric view of an example of an implementation of a dual-band antenna in accordance with the disclosure.

Techniques are discussed for a dual-band antenna. The dual-band antenna may comprise: a first patch radiator configured to operate at a first frequency band with a first polarization; a second patch radiator configured to operate at a second frequency band with a second polarization that is opposite to the first polarization, where the second patch radiator is positioned above the first patch radiator in a vertical stack up configuration and the first frequency band is lower than the second frequency band, a ground plane positioned between the first patch radiator and the second patch radiator within the vertical stack up configuration; a first feed network having a first signal path and a second signal path that are both electrically coupled to a first feed side of the first patch radiator; a second feed network having a third signal path and a fourth signal path that are both electrically coupled to a second feed side of the second patch radiator; and a conductive vertical surface along the vertical stack up configuration, where the conductive vertical surface is in electrical proximity to the first patch radiator and both the first signal path and the second signal path.

The dual-band antenna may comprise: a first patch radiator, a second patch radiator, a ground plane, a first energy coupler, a second energy coupler, and a conductive wall (e.g., a conductive surface). In this example, the first patch radiator is configured to operate at a first frequency band and a first polarization and a second patch radiator configured to operate at a second frequency band and a second polarization that is orthogonal to the first polarization. The second patch radiator overlays the first patch radiator in a stack up configuration, the first frequency band is a lower frequency band than the second frequency band, and the first ground plane is positioned between the first patch radiator and the second patch radiator within the stack up configuration. The first energy coupler may include a first signal path and a second signal path, where both the first signal path and the second signal path are electrically coupled to a first coupling portion of the first patch radiator; the second energy coupler may include a third signal path and a fourth signal path, where both the third signal path and the fourth signal path are electrically coupled to a second coupling portion of the second patch radiator; and the conductive wall is located adjacent to and along the stack up configuration, where the conductive wall is in electrical proximity to the first patch radiator, the first signal path, and the second signal path.

The dual-band antenna may further include a second ground plane positioned below the first patch radiator, where the second ground plane is electrically coupled to the first ground plane. Further, the conductive wall may be electrically coupled to the second ground plane.

Additionally disclosed is another dual-band antenna comprising: a first patch radiator configured to operate at a first frequency band with a first polarization; a second patch radiator configured to operate at a second frequency band with a second polarization that is orthogonal to the first polarization, where the second patch radiator is positioned above the first patch radiator in a vertical stack up configuration and the first frequency band is lower than the second frequency band, means for lowering crosstalk between the first patch radiator and the second patch radiator within the vertical stack up configuration; means for driving the first patch radiator at the first frequency band and the first polarization; means for driving the second patch radiator at the second frequency band and the second polarization; and means for lowering the first frequency band of the first patch radiator.

In general, examples in this disclosure may include a stacked antenna structure including a ground portion positioned between radiators in the stack. The ground portion may be smaller than the radiators and/or may be grounded around feeds coupled to one of the radiators. The structure may be disposed adjacent a metal wall, and/or coupled to hybrid feed structures with matching stubs.

Figure 14:
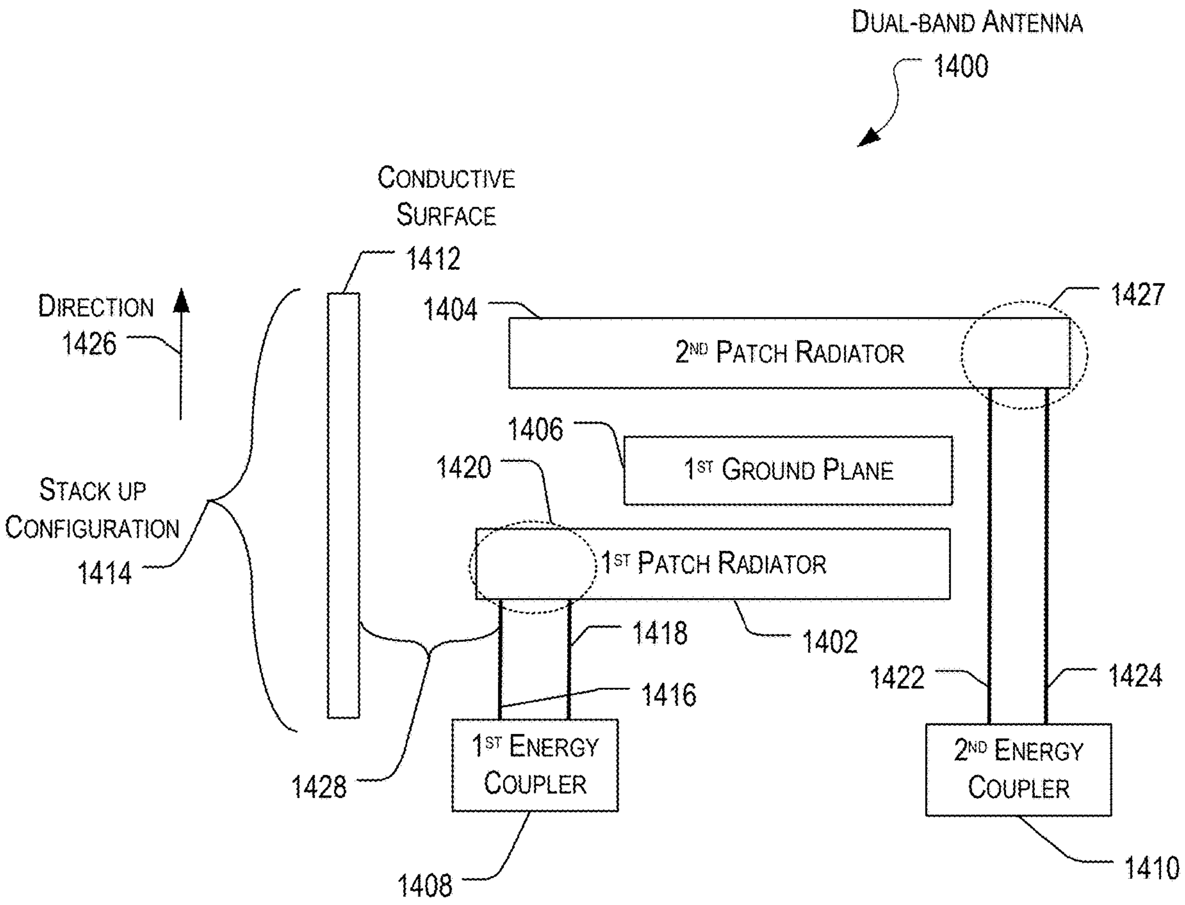
FIG. 14 is a system block diagram of an example of an implementation of a dual-band antenna shown in FIGS. 1, 3, 4, and 6-10.

FIG. 14 is a system block diagram of an example of an implementation of a dual-band antenna 1400. The dual-band antenna 1400 may comprise a first patch radiator 1402, a second patch radiator 1404, a ground plane (i.e., a first ground plane 1406), a first energy coupler 1408, a second energy coupler 1410, and a conductive wall 1412. In this example, the first patch radiator 1402 is configured to operate at a first frequency band and a first polarization and the second patch radiator 1404 is configured to operate at a second frequency band and a second polarization that is orthogonal to the first polarization. Further, in this example, the second patch radiator 1404 overlays the first patch radiator 1402 in a stack up configuration 1414 and the first frequency band is a lower frequency band than the second frequency band. Moreover, the first ground plane 1406 is positioned between the first patch radiator 1402 and the second patch radiator 1404 within the stack up configuration 1414; the first energy coupler 1408 has a first signal path 1416 and a second signal path 1418, where both the first signal path 1416 and the second signal path 1418 are electrically coupled to a first coupling portion 1420 of the first patch radiator 1402; the second energy coupler 1410 has a third signal path 1422 and a fourth signal path 1424, where both the third signal path 1422 and the fourth signal path 1424 are electrically coupled to a second coupling portion 1427 of the second patch radiator 1404; and the conductive wall 1412 is adjacent and along the stack up configuration 1414 along a first direction 1426, where the conductive wall 1412 is in electrical proximity 1428 to the first patch radiator 1402, the first signal path 1416, and the second signal path 1418.

In this example, the stack up configuration 1414 may be a vertical stack up configuration where the first direction 1426 is along a height of the vertical stack up configuration. As such, the conductive wall 1412 may be a set of conductive vias, or a conductive vertical surface, that is adjacent to and along first direction 1426 (i.e., the height) of the vertical stack up configuration. In this example, the electrical proximity 1428 of the conductive wall 1412 to the first patch radiator 1402, first signal path 1416, and second signal path 1418 is a physical distance that is based on the frequency of operation (i.e., the first frequency band) of the first patch radiator 1402 that may be driven by the first energy coupler 1408 (via the first signal path 1416 and the second signal path 1418) or electromagnetically excited by a received signal at the first patch radiator 1402. The physical distance of the electrical proximity 1428 is based on the corresponding wavelength of operation of the first frequency band.

Turning to FIG. 1, an isometric view of an example of an implementation of a dual-band antenna 100 is shown. The dual-band antenna 100 may comprise a first patch radiator 102, a second patch radiator 104, a ground plane 106, a conductive vertical surface 108, a first feed network 110, and a second feed network 112 along a first direction 101, second direction 103, and third direction 105. For ease of illustration, the first direction 101 and second direction 103 may be a length direction and a width direction along a horizontal plane and the third direction 105 may be a direction perpendicular to the horizontal plane that may be a vertical/height direction.

In this example, the first feed network 110 is an example of the first energy coupler 1408 and is a device that includes multiple signal paths to drive the first patch radiator 102 when transmitting; and receive input signals from the first patch radiator 102 when the first patch radiator 102 is receiving signals that electromagnetically excite the first patch radiator 102. Similarly, the second feed network 112 is an example of the second energy coupler 1410 and is a device that includes also multiple signal paths to drive the second patch radiator 104 when transmitting; and receive input signals from the second patch radiator 104 when the second patch radiator 104 is receiving signals that electromagnetically excite the second patch radiator 104. In these examples, both the first feed network 110 and second feed network 112 are bi-directional devices that are configured to transmit and receive signals from the first patch radiator 102 and second patch radiator 104, respectively.

In this example, the second patch radiator 104 may be positioned above the first patch radiator 102 (along the third direction 105) in a vertical stack up configuration 114 and the ground plane 106 may be positioned between the first patch radiator 102 and the second patch radiator 104 within the vertical stack up configuration; and the conductive vertical surface 108 may be located along a perimeter 116 (along the first direction 101 and second direction 103) of the vertical stack up configuration 114 in electrical proximity to the first patch radiator 102. The first feed network 110 may have two signal paths (i.e., a first signal path 118 and a second signal path 120) that are electrically coupled to a first feed side 122 of the first patch radiator 102 and the second feed network 112 may have two signal paths (i.e., a third signal path 124 and a fourth signal path 126) that are electrically coupled to a second feed side 128 of the second patch radiator 104. In this example, the first feed side 122 of the first patch radiator 102 and the second feed side 128 of the second patch radiator 104 are examples of the first coupling portion 1420 of the first patch radiator 1402 and second coupling portion 1427 of the second patch radiator 1404 discussed in relation to FIG. 14.

The conductive vertical surface 108 may also be located along the perimeter 116 of the vertical stack up configuration 114 in electrical proximity to both the first signal path 118 and second signal path 120. The conductive vertical surface 108 may be a metallic wall, or element, constructed of conductive material such as, for example, one or more metal plates, metal vias, or metallic tape that may include, for example, copper or other conductive materials. The conductive vertical surface 108 may be a means for lowering the first frequency band of the first patch radiator 102 by being configured to electrically enlarge the first patch radiator 102 and, therefore, shift the first frequency band of the first patch radiator downward in frequency to a lower band. The conductive vertical surface 108 performs this function by coupling the return currents of the feeds (i.e., the first signal path 118 and second signal path 120) to the conductive vertical surface 108. Using this technique, the size of the first patch radiator 102 may be reduced for the same desired operating band.

In this example, the first patch radiator 102 is configured to operate at a first frequency band with a first polarization and the second patch radiator 104 is configured to operate at a second frequency band with an orthogonal (e.g., which may be opposite) polarization to the first polarization. As an example, each polarization may be a circular polarization and the first frequency band may be lower than the second frequency band. For example, the first frequency band may be L-band (1.52 to 1.66 GHz) and the second frequency band may be S-band (1.98 GHz to 2.2 GHz).

In this example, both the first patch radiator 102 and the second patch radiator 104 are shown as being rectangular shaped planar patch radiators, however, it is noted that the geometry and shape of the first patch radiator 102 and the second patch radiator 104 may also be other none-rectangular and/or planar patch radiators based on the design of the dual-band antenna 100. Further, both uniform or irregular shapes for the ground plane may be utilized based on the design.

As an example, the ground plane 106 has a surface area 130 that is smaller than a surface area 132 of the second patch radiator 104 and the second feed side 128 of the second patch radiator 104 may be located at a first location 134 opposite a second location 136 of the first feed side 122 of the first patch radiator 102 relative to a center 138 of the vertical stack up configuration 114, where the second location 136 of the first feed side 122 is offset from both the center 138 of the vertical stack up configuration 114 and a center 140 of the first patch radiator 102. In this example, the first feed side 122 is offset towards a corner 142 of the first patch radiator 102. Similarly, the first location 134 of the second feed side 128 is offset from both the center 138 of the vertical stack up configuration 114 and a center 144 of the second patch radiator 104 such that the second feed side 128 is offset towards a corner 147 of the second patch radiator 104. In this example, the first patch radiator 102, second patch radiator 104, and ground plane 106 are each conductive elements constructed of conductive material such as, for example, a metal plate that may include, for example, copper or other conductive materials. In this example, the ground plane 106 is a means for lowering cross-talk between the first patch radiator 102 and the second patch radiator 104 within the vertical stack up configuration 114 by being configured to: prevent capacitive coupling between the first patch radiator 102 and the second patch radiator 104; not interfere with the performance of the dual-band antenna 100; and enable more of the available power to be radiated by the dual-band antenna 100.

In this example, the vertical stack up configuration 114 may be filled with a dielectric 148 having a surface 150, where the second patch radiator 104 may be optionally located on top of, partially extending from, or located below the surface 150 of the dielectric 148. An example of the dielectric 148 may be, for example, FR4 material or other dielectric, such as, for example, ceramic, plastic, glass, air, etc. The first feed network 110 and second feed network 112 are located below the vertical stack up configuration 114, beneath a bottom ground plane 152 that is located at the bottom of the vertical stack up configuration 114, below the first patch radiator 102. In this example, the bottom ground plane 152 is a conductive element constructed of conductive material such as, for example, a metal plate that may include, for example, copper or other conductive materials.

As an example, the bottom ground plane 152 may have a top surface 154 and a bottom surface 156, where the first feed network 110 and the second feed network 112 are located beneath the bottom surface 156 and the vertical stack up configuration 114 is located above the top surface 154. An additional dielectric layer (not shown) may also be located adjacent to the bottom surface 156 of the bottom ground plane 152. As an example, both the first feed network 110 and second feed network 112 may be attached adjacent to the bottom surface 156 of the bottom ground plane 152, where the dielectric layer may be sandwiched between the bottom surface 156 and the first feed network 110 and the second feed network 112.

In this example, the first feed network 110 may be a means for driving the first patch radiator 102 at the first frequency band with the first polarization and the second feed network 112 may be a means for driving the second patch radiator 104 at the second frequency band with the second polarization. Specifically, the first signal path 118 and the second signal path 120 of the first feed network 110 are electrically coupled to the first patch radiator 102 at the first feed side 122 and the third signal path 124 and the fourth signal path 126 of the second feed network 112 are electrically coupled to the second patch radiator 104 at the second feed side 128. The third signal path 124 and the fourth signal path 126 are shown as electrically coupled to the second feed side 128 of the second patch radiator 104 by passing through both the first patch radiator 102 and the ground plane 106. In general, each pair of signal paths (i.e., first signal path 118 and second signal path 120 and third signal path 124 and fourth signal path 126) is electrically coupled to a pair of corresponding excitation points on the first patch radiator 102 and second patch radiator 104.

These excitation points are feed points that are configured to drive the corresponding patch radiator to radiate radio frequency (RF) signal at both with the designed frequency band and with the desired polarization. As an example, within the first feed side 122 and the second feed side 128, there are two corresponding feed points. For example, the first feed side 122 may include a first feed point 158 and a second feed point 160; and the second feed side 128 may include a third feed point 162 and a fourth feed point 164.

In this example, the first feed point 158 and the second feed point 160 are examples of excitation points that include a first electrical connection point and a second electrical connection point on the first coupling portion 1420 of the first patch radiator 1402; and the third feed point 162 and a fourth feed point 164 are examples of excitation points that includes a third electrical connection point and fourth electrical connection point on the second coupling portion 1427 of the second patch radiator 1404.

As discussed previously, the first feed point 158 is located at a first location that is offset from a first center position (i.e., second location 136) of the first feed side 122 (i.e., the first coupling portion) in a first offset direction that is along a direction (within the plane defined by the first direction 101 and second direction 103 that is coplanar with the surface area 146 of the first patch radiator 102) between the position of the first feed point 158 and the second feed point 160; and the second feed point 160 is located at a second location that is offset from the first center position (i.e., the second location 136) of the second feed side 128 (i.e., the first coupling portion) in a second offset direction that is along a direction within the plane defined by the first direction 101 and second direction 103 that is coplanar with the surface area 132 of the second patch radiator 104) between the position of the first feed point 158 and the second feed point 160. In this example, the second offset direction is opposite the first offset direction.

As an example, the ground plane 106 has a surface area 130 that is smaller than a surface area 132 of the second patch radiator 104 and the second feed side 128 of the second patch radiator 104 may be located at a first location 134 opposite a second location 136 of the first feed side 122 of the first patch radiator 102 relative to a center 138 of the vertical stack up configuration 114, where the second location 136 of the first feed side 122 is offset from both the center 138 of the vertical stack up configuration 114 and a center 140 of the first patch radiator 102.

In this example, in order to produce a circular, or elliptical, polarization, the feed points (within a corresponding feed side) are spaced and located opposite each other along the feed side. This configuration, along with driving each feed point with signals that are approximately ninety (90) degrees out of phase, produces the elliptical polarization for a radiated RF signal of the patch radiator that may be designed to be circular polarization. As an example, based on the designs of the first feed network 110 and second feed network 112, the first patch radiator 102 may be configured to radiate a right-hand circularly polarized (RHCP) RF signal and the second patch radiator 104 may be configured to radiate a left-hand circularly polarized (LHCP) RF signal, or alternatively, the first patch radiator 102 may be configured to radiate a LHCP RF signal and the second patch radiator 104 may be configured to radiate a RHCP RF signal.

Specifically, the first signal path 118 may be electrically coupled to the first feed side 122 at the first feed point 158 that is located at a first location; and the second signal path 120 may electrically coupled to the first feed side 122 at the second feed point 160 that is located at a second location that is opposite the first location within the first feed side 122. In this example, the first feed network 110 may further include a first signal feed path and a second signal feed path that is electrically longer than the first signal feed path and is configured to produce the first polarization of the first patch radiator 102 by introducing an electrical 90-degree phase shift in the second signal feed path as compared to the first signal feed path, where the first signal feed path is electrically coupled to the first signal path 118, and the second signal feed path is electrically coupled to the second signal path 120. Similarly, the third signal path 124 may be electrically coupled to the second feed side 128 at the third feed point 162 located at a third location; and the fourth signal path 126 may be electrically coupled to the second feed side 128 at the fourth feed point 164 that is located at a fourth location that is opposite the third location within the second feed side 128. In this example, the second feed network 112 may further include a third signal feed path and a fourth signal feed path that is electrically longer than the third signal feed path and is configured to produce the second polarization of the second patch radiator by introducing an electrical 90-degree phase shift in the fourth signal feed path as compared to the third signal feed path, where the third signal feed path is electrically coupled to the third signal path 124, and the fourth signal feed path is electrically coupled to the fourth signal path 126. In these examples, the first feed network 110 may include a first meandered hybrid coupler with one or more first matching stubs; and the second feed network 112 may include a second meandered hybrid coupler with one or more second matching stubs.

In these examples, the third signal path 124 and fourth signal path 126 may be implemented as two coaxial transmission lines (i.e., two coaxial cables) or stripline transmission lines. If the two signal paths are coaxial cables, each may include an outer non-conductive sheath, a conductive shield, an inner dielectric insulator, and a conductive core. In this example, each coaxial transmission line would be passed through the bottom ground plane 152 and the first patch radiator 102 via first pass hole 166, second pass hole 168, third pass hole 170, and fourth pass hole 172. Specifically, the third signal path 124 passes through the first pass hole 166 in the bottom ground plane 152 and the third pass hole 170 in the first patch radiator 102; and the fourth signal path 126 passes through the second pass hole 168 in the bottom ground plane 152 and the fourth pass hole 172 in the first patch radiator 102. At the ground plane 106, the third signal path 124 and fourth signal path 126 pass through the ground plane 106 at fifth pass hole 174 and sixth pass hole 176, respectively; however, in this example, when the third signal path 124 and fourth signal path 126 pass through the ground plane 106, the conductive shield of both the third signal path 124 and the fourth signal path 126 are electrically coupled to the ground plane 106 and the conductive cores of the third signal path 124 and the fourth signal path 126 are passed to and electrically coupled to the second patch radiator 104 at the third feed point 162 and fourth feed point 164, respectively, of the second feed side 128. In this example, the conductive shields of both the third signal path 124 and the fourth signal path 126 may also be electrically coupled to the bottom ground plane such that the ground plane 106 may be electrically grounded to the bottom ground plane 152. Similarly, the first signal path 118 and second signal path 120 may pass through the bottom ground plane 152 at a seventh pass hole 178 and an eighth pass hole 180, where both signal paths may be electrically coupled to the bottom ground plane 152 and the conductive cores of the first signal path 118 and the second signal path 120 are passed to and electrically coupled to the first patch radiator 102 at the first feed point 158 and second feed point 160, respectively, of the first feed side 122. Alternatively, or in combination with these previous examples, the first signal path 118, second signal path 120, third signal path 124, and fourth signal path 126 may be implemented as stripline transmission lines utilizing conductive vias that are constructed using printed circuit board (PCB) techniques.

It is noted, that for purposes of illustration, a pair of hidden lines (shown as ovals for the first feed point 158, second feed point 160, third feed point 162, and fourth feed point 164) are shown within the first feed side 122 and the second feed side 128 illustrating the approximate location of the electrical connection points of the first signal path 118, second signal path 120, third signal path 124, and fourth signal path 126 on the corresponding bottom surfaces of the first patch radiator 102 and second patch radiator 104. Further, the conductive vertical surface 108 is also shown with hidden lines to better illustrate the other elements within the vertical stack up configuration 114 of the dual-band antenna 100.

In these examples, the conductive vertical surface 108 may surround the vertical stack up configuration 114 along the perimeter 116 of the vertical stack up configuration 114. A height and a location of the conductive vertical surface 108 along the vertical height of the vertical stack up configuration 114 depends on the design of the dual-band antenna 100. As an example, the conductive vertical surface 108 may surround the first patch radiator 102 within electrical proximity to the edges of the first patch radiator 102 and the first signal path 118 and the second signal path 120. In this example, the conductive vertical surface 108 may be a conductive band surrounding the first patch radiator 102. The conductive band of the conductive vertical surface 108 may also further surround the ground plane 106. Moreover, the conductive band of the conductive vertical surface 108 may also further surround the second patch radiator 104 (or a part of the second patch radiator 104).

In these examples, the conductive vertical surface 108 and ground plane 106 are configured to adjust and/or tune the frequency performance (i.e., by lowering the frequency band) of the first patch radiator 102 based on a horizontal distances/locations (i.e., the electrical proximity) of the corresponding edges of the first patch radiator 102 and the first signal path 118 and second signal path 120 to the conductive vertical surface 108 and the vertical distance/location (i.e., the electrical proximity) of the ground plane 106 to the first patch radiator 102, the second patch radiator 104, or both. Examples of the electrical proximity will be discussed later in relation to FIG. 15.

As will be discussed later, the first feed network 110 and second feed network 112 may utilize, for example, may utilize meandered hybrid couplers in combination with matching stubs. These feed networks serve to match the dual-band antenna 100 operation for a large bandwidth for both lower and upper frequency bands. They acquire the necessary phase shifts between the orthogonal ports of signal paths pairs to the first patch radiator 102 and second patch radiator 104 for circular polarization radiation; and confines the first feed network 110 and second feed network 112 within an available footprint below the bottom ground plane 152.

Figure 2:
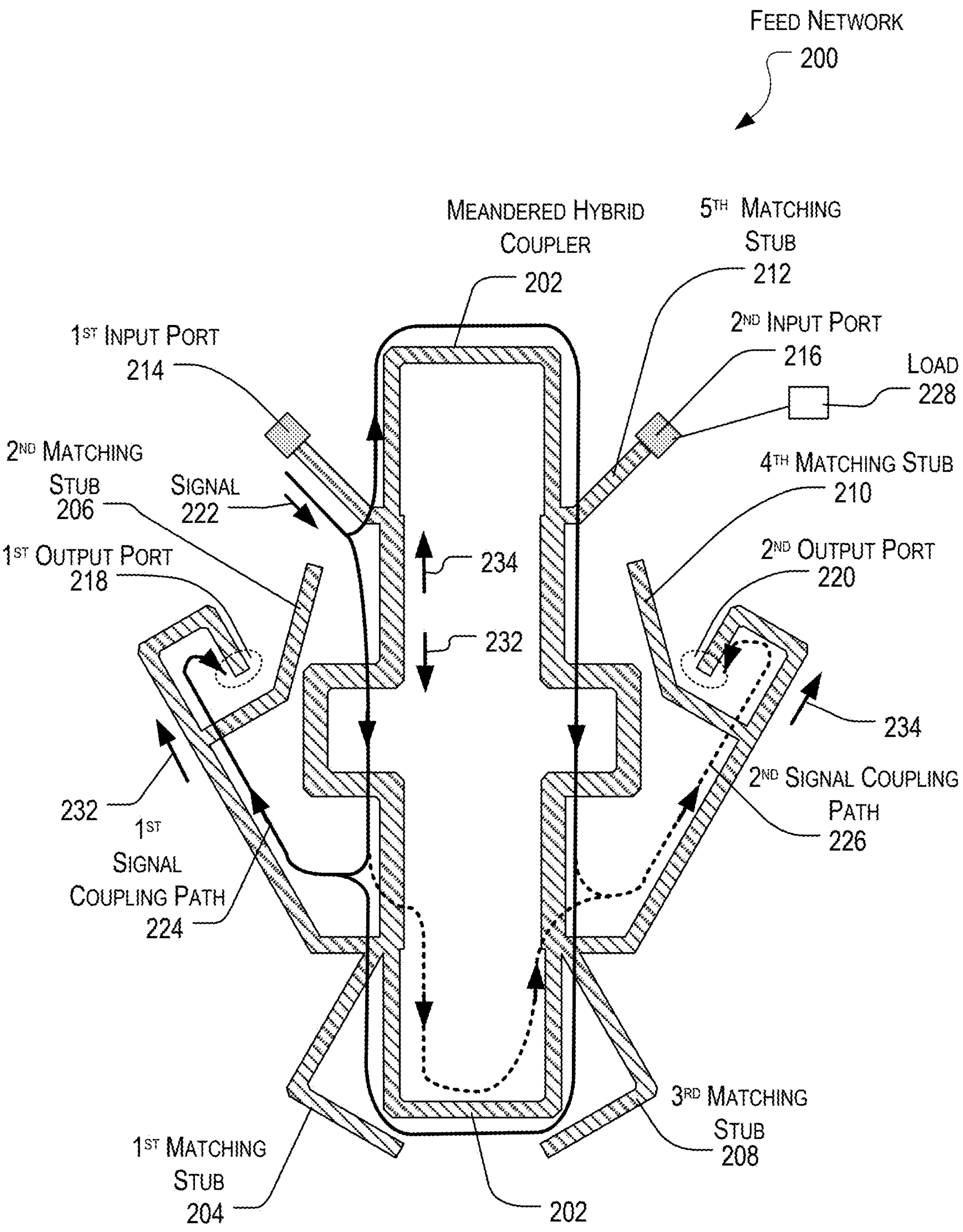
FIG. 2. is a top view of an example of an implementation of feed network shown in FIG. 1 in accordance with the disclosure.

Turning to FIG. 2, a top view of an example of an implementation of a feed network 200 is shown. The feed network 200 is energy coupler and may be an example of an implementation of either the first feed network 110 (i.e., a first energy coupler 1408), second feed network 112 (i.e., a second energy coupler 1410), or both. In this example, the feed network 200 may include a meandered hybrid coupler 202, one or more first matching stubs (e.g., a first matching stub 204, a second matching stub 206, a third matching stub 208, a fourth matching stub 210, and a fifth matching stub 212), a first input port 214, a second input port 216, a first output port 218, and a second output port 220. In this example, the first input port 214 is configured to receive an input signal 222 to drive either the first patch radiator 102 or the second patch radiator 104 via either the first signal path 118 and the second signal path 120 or the third signal path 124 and the fourth signal path 126.

The feed network 200 includes a first signal feed path 224 and a second signal feed path 226 that is longer than the first signal feed path 224 and is configured to produce the first polarization of the first patch radiator by introducing an electrical 90-degree phase shift in the second signal feed path 226 compared to the first signal feed path 224. In this example, the second input port 216 may be terminated by a matching termination load 228 that causes the transmission line from the second input port 216 to act as the fifth matching stub 212.

In an example of operation, the input signal 222 may be injected into the first input port 214. As an example, the input signal 222 may be then divided into a first sub-signal 232 and a second sub-signal 234 that travel along the first signal feed path 224 and the second signal feed path 226 towards the first output port 218 and the second output port 220, where based on the electrical distance traveled along the first signal feed path 224 and the second signal feed path 226, the second sub-signal 234 will arrive at the second output port 220 with an electrical phase shift of approximately 90 degrees as compared to the electrical phase of the first sub-signal 232 that arrives at the first output port 218. The first sub-signal 232 and second sub-signal 234 may then utilized to drive a pair of signal paths (i.e., the first signal path 118 and second signal path 120 or the third signal path 124 and fourth signal path 126) that drive either the first patch radiator 102 or second patch radiator 104. It is noted that the proceeding description is merely an example of signal paths and is not intended to be limiting. Any other signal paths and or feed network 200 may be utilized without departing from the description. The general purpose of the signal paths are to produce or receive signals at first output port 218 and second output port 220 (which will also be input ports when receiving signals) that have an approximately 90 degree phase difference between the signals at the first output port 218 and the signals at the second output port 220.

Figure 3:
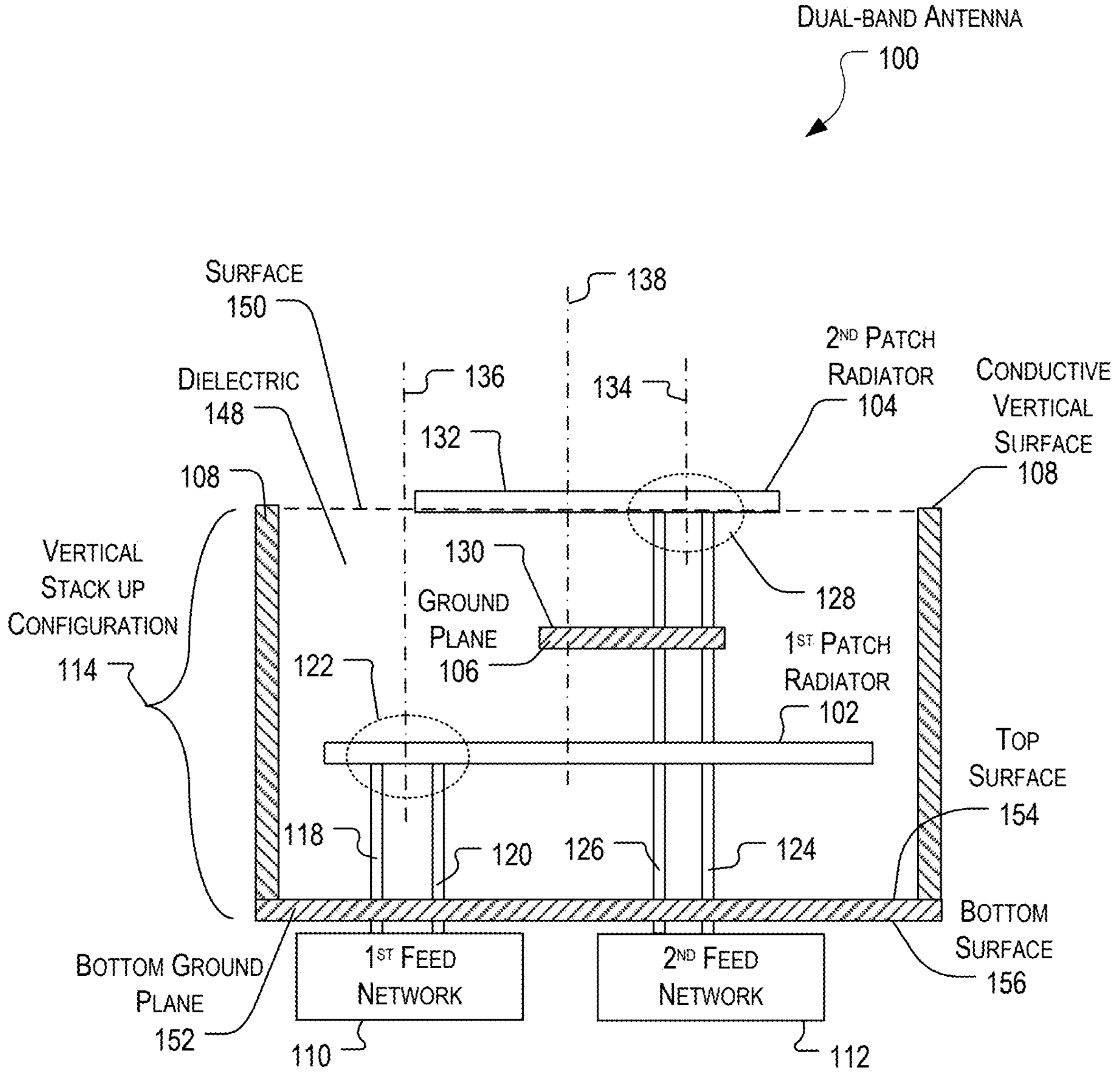
FIG. 3 is a front view of the dual-band antenna shown in FIG. 1 along cut A-A' in accordance with the disclosure.

FIG. 3 is a front view of the dual-band antenna 100 along cut A-A'. In this example, the conductive vertical surface 108 is shown surrounding the entire height of the vertical stack up configuration 114 and the second patch radiator 104 is shown positioned on top of the surface 150 of the dielectric 148. As discussed previously, the second patch radiator 104 may also be optionally located partially within or below the surface 150 of the dielectric 148.

Figure 4:
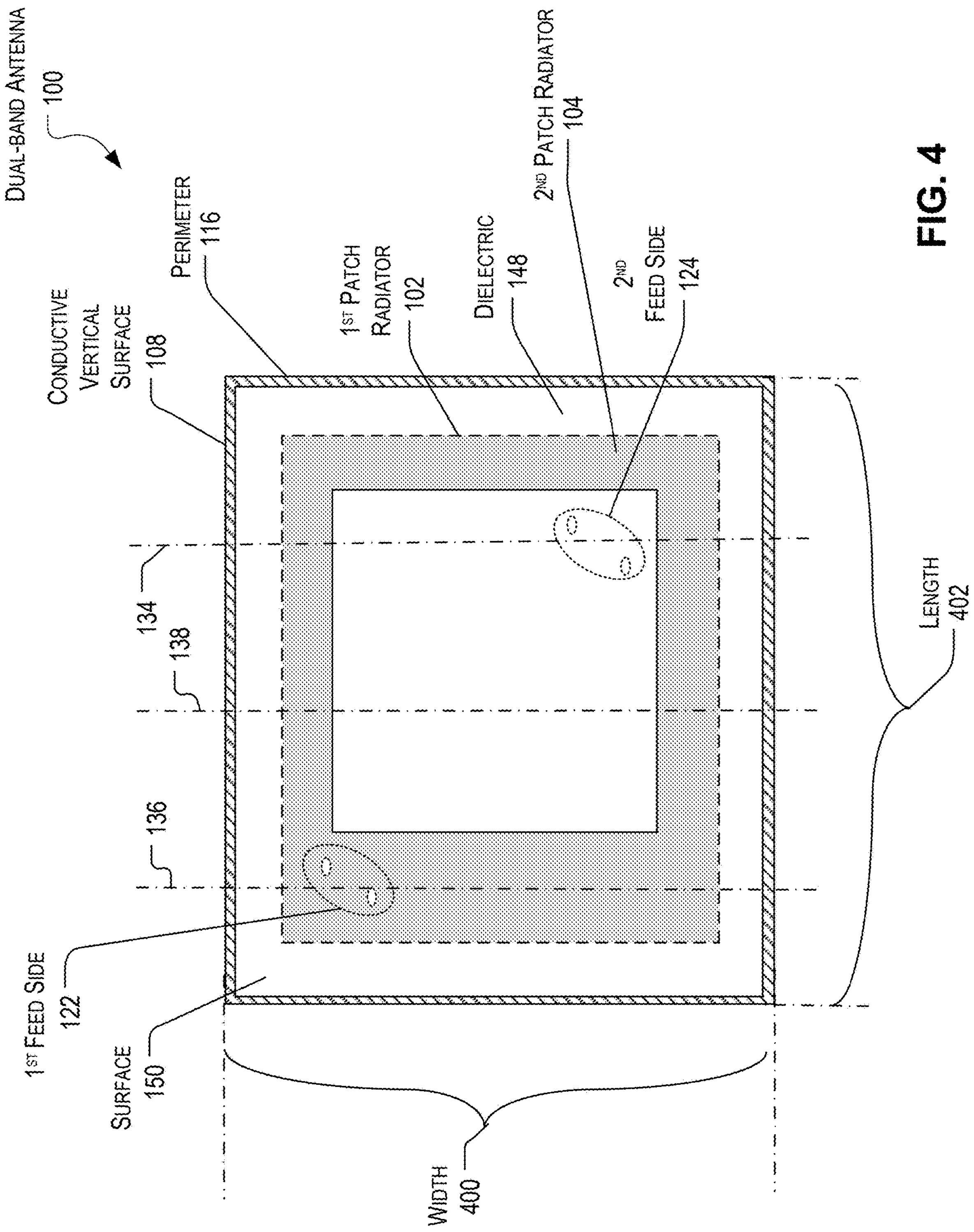
FIG. 4 is a top view of the dual-band antenna shown in FIGS. 1 and 3 in accordance with the disclosure.
Figure 5:
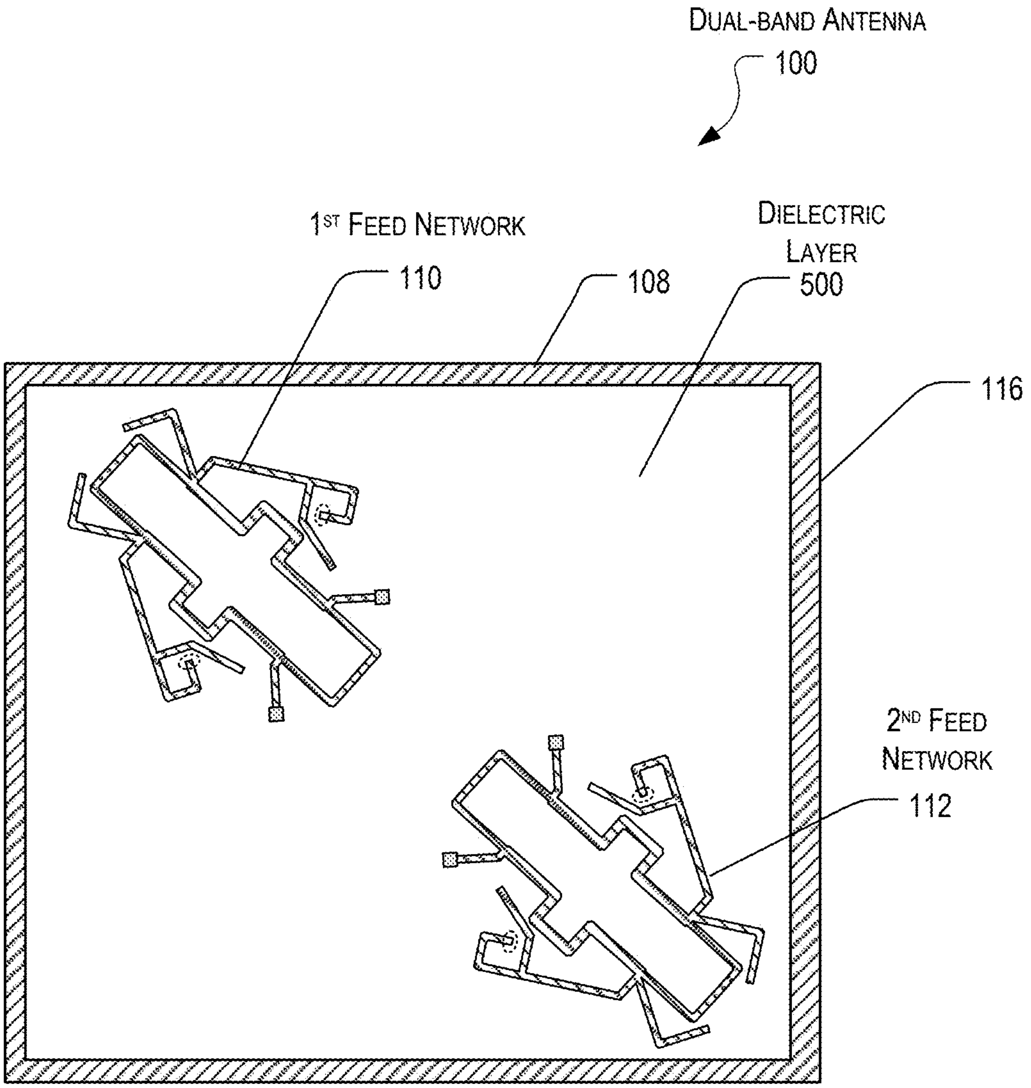
FIG. 5 is a bottom view of the dual-band antenna shown in FIGS. 1, 3, and 4 in accordance with the disclosure.
Figure 15:
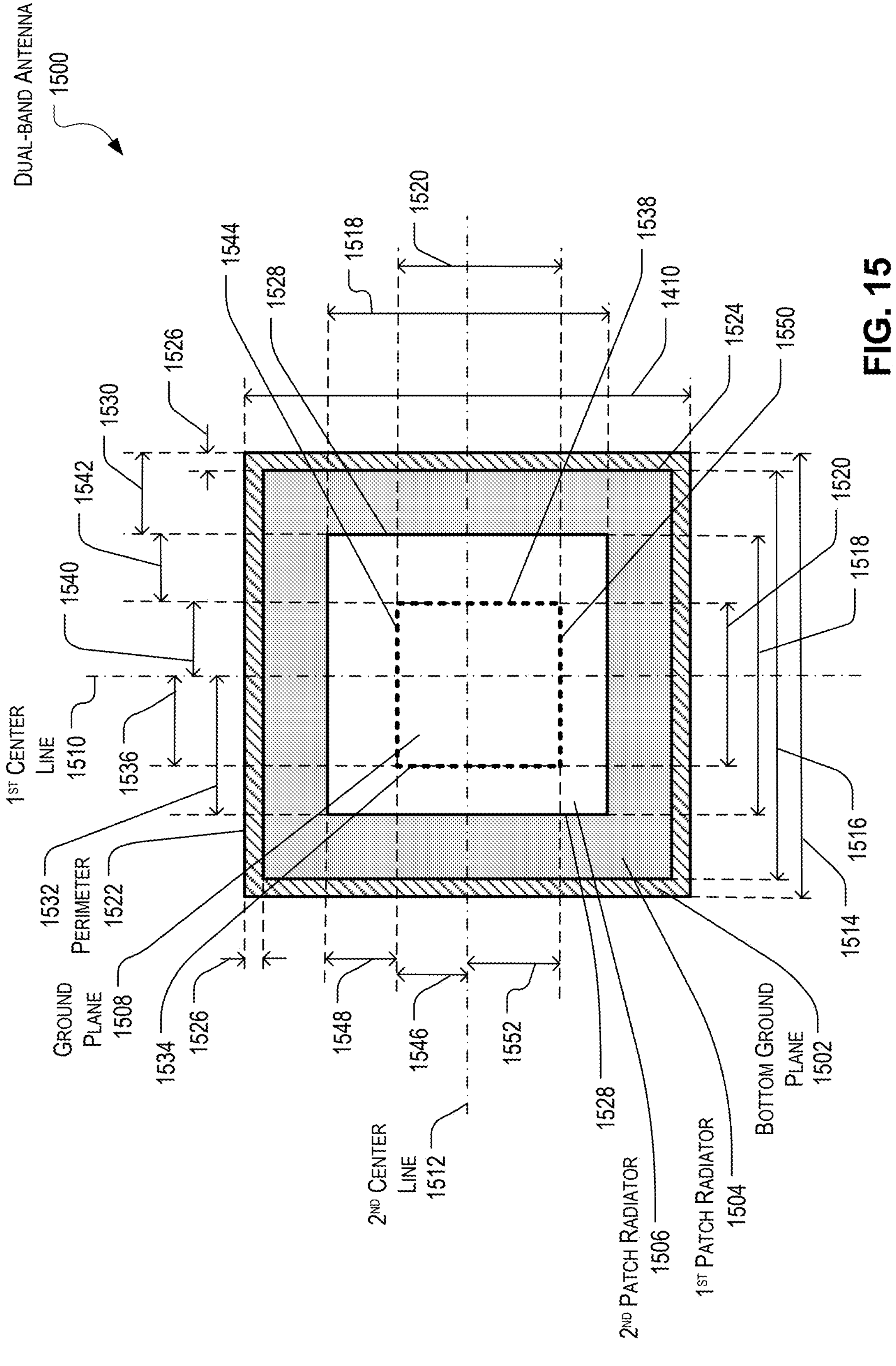
FIG. 15 is another top view of the dual-band antenna shown in FIGS. 1, 3, 4, 6-10, and 14 in accordance with the disclosure.

Turning to FIG. 4, a top view of the dual-band antenna 100 is shown where the conductive vertical surface 108 is shown surrounding the entire length of the perimeter 116 of the vertical stack up configuration 114. FIG. 5 is a bottom view of the dual-band antenna 100. In this view, the first feed network 110 and second feed network 112 are shown along the bottom of the bottom ground plane 152 where there may be a dielectric layer 500 sandwiched between the bottom ground plane 152 and the dielectric layer 500. In these examples, the dual-band antenna 100 may have a height (i.e., the height of the vertical stack up configuration), and a width 400 and a length 402 along the perimeter 116. As an example, the width 400 and length 402 may each be approximately 75 millimeters and the height of the vertical stack up configuration may be approximately 12 millimeters. In FIG. 15, examples of the dimensions for the first patch radiator 102, second patch radiator 104, conductive vertical surface 108, ground plane 106, and bottom ground plane 152, are shown and discussed.

Figure 6:
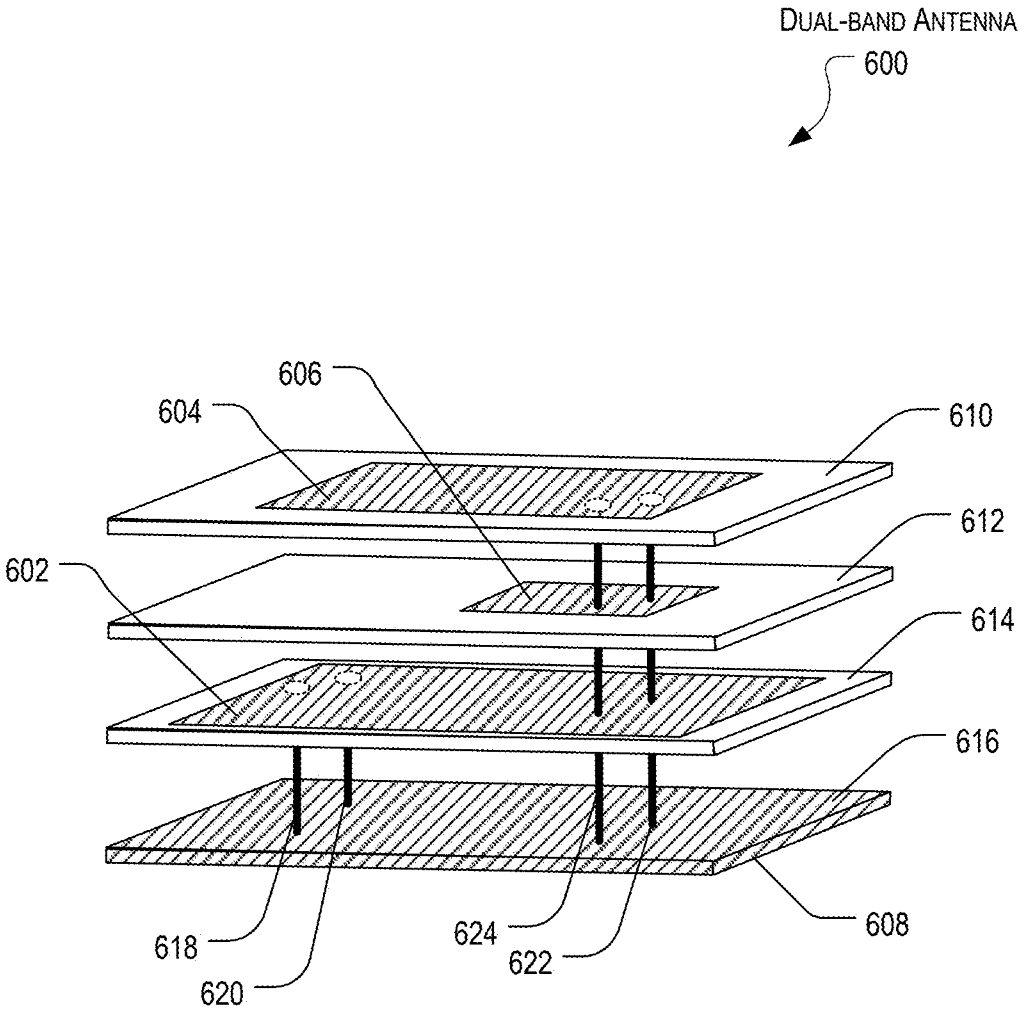
FIG. 6 is an exploded isometric view of an example of an implementation of a dual-band antenna utilizing stacked printed circuit board (PCB) layers to produce a vertical stack up configuration in accordance with the disclosure.

FIG. 6 is an exploded isometric view of an example of an implementation of a dual-band antenna 600 utilizing stacked PCB layers to produce a vertical stack up configuration. In this example, the first patch radiator 602, second patch radiator 604, ground plane 606, and bottom ground plane 608 may be each produced within a dielectric substrate such as, for example, first substrate 610, second substrate 612, third substrate 614, and fourth substrate 616, respectively. The first signal path 618, second signal path 620, third signal path 622, and fourth signal path 624 may be produced utilizing PCB manufactured conductive vias as transmission lines. In this example, additional dielectric substrates (not shown) may be layered between the first substrate 610, second substrate 612, third substrate 614, and fourth substrate 616.

Figure 7:
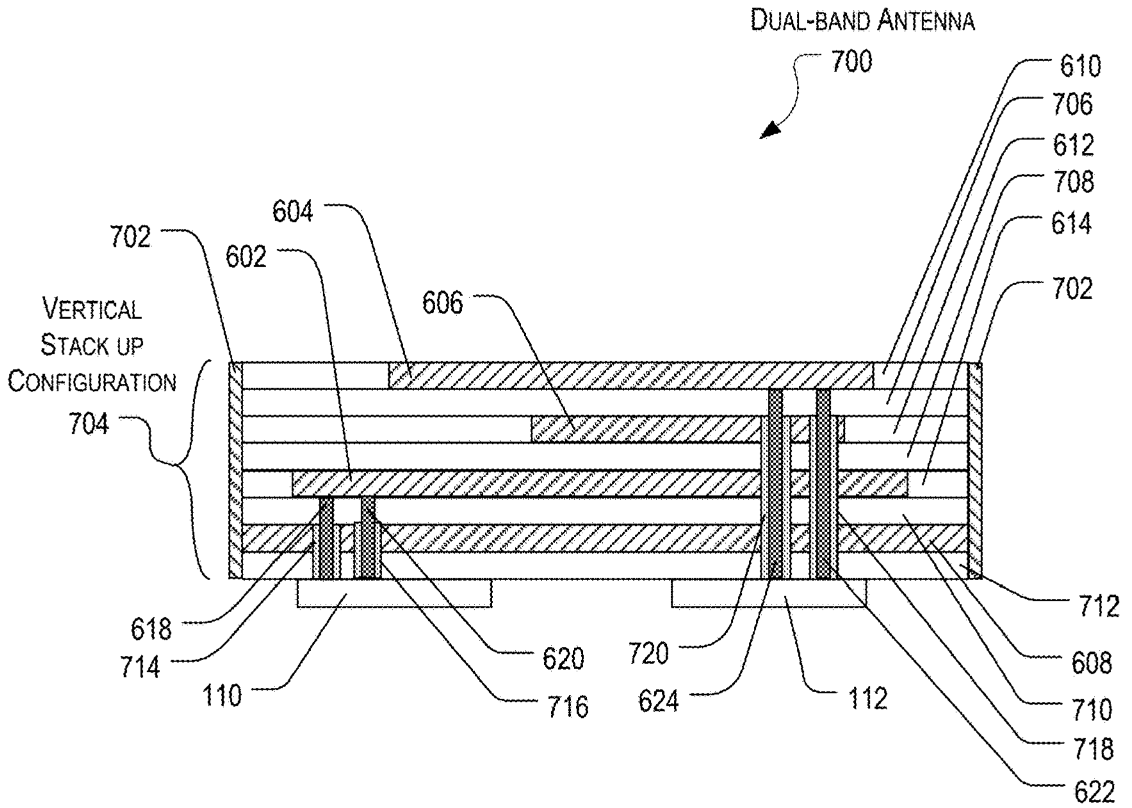
FIG. 7 is a front view of the dual-band antenna shown in FIG. 6 utilizing stacked PCB layers and a conductive vertical surface that covers the entire vertical stack up configuration of the dual-band antenna.
Figure 16:
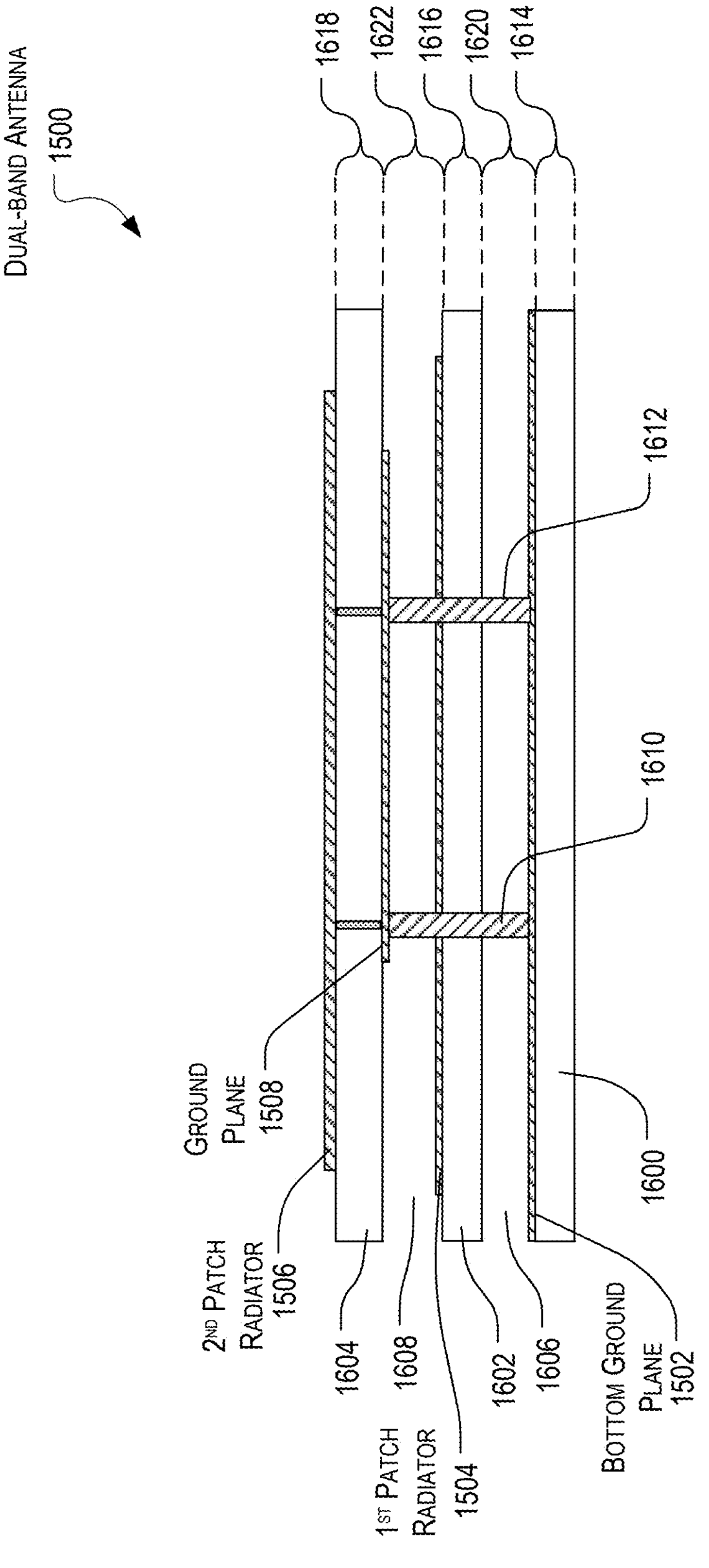
FIG. 16 is a side view of the dual-band antenna shown in FIGS. 1, 3, 4, 6-10, and 14-15 utilizing stacked layers of the vertical stack up configuration in accordance with the disclosure.

Turning to FIG. 7, a front view of the dual-band antenna 700 is shown in utilizing stacked PCB layers and a conductive vertical surface 702 that covers the entire height of the vertical stack up configuration 704 of the dual-band antenna 700. In this example, the dual-band antenna 700 utilizes the same substrate layers described in relation to FIG. 6 and, in addition, includes dielectric layers 706, 708, 710, and 712 as dielectric spacers between the first patch radiator 602, second patch radiator 604, ground plane 606, and bottom ground plane 608. It is noted that some, or all, of the dielectric layers 706, 708, 710, and 712 may be air gaps. In this example, the first signal path 618, second signal path 620, third signal path 622, and fourth signal path 624 may utilize conductive vias that are partially enclosed with non-conductive materials such as a first non-conductive sleave 714, a second non-conductive sleave 716, a third non-conductive sleave 718, and a fourth non-conductive sleave 720 that correspond to the first signal path 618, second signal path 620, third signal path 622, and fourth signal path 624, respectively. Moreover, in this example, the dielectric layer 712 may be sandwiched between the bottom surface of the bottom ground plane 608 and the first feed network 110 and the second feed network 112. In FIG. 16, examples of the thickness and type of dielectric layers will be shown and discussed.

Figure 8:
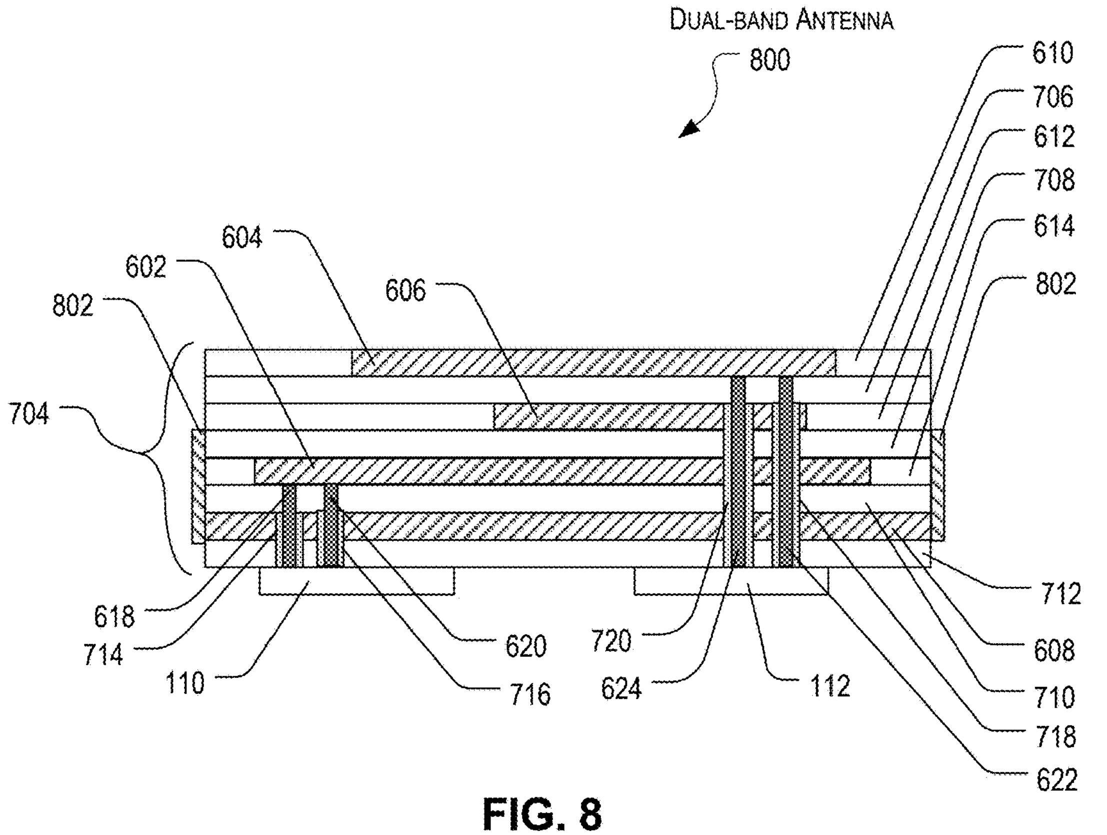
FIG. 8 is a front view of the dual-band antenna shown in FIG. 6 utilizing stacked PCB layers and a conductive vertical surface that covers a first patch radiator within the vertical stack up configuration of the dual-band antenna.

FIG. 8 is front view of the dual-band antenna 800 utilizing stacked PCB layers and a conductive vertical surface 802 that covers the first patch radiator 602 and the first signal path 618 and second signal path 620 within the vertical stack up configuration 704 of the dual-band antenna 800. This example is similar to the example described in relation to FIG. 7, except that the conductive vertical surface 802 does not surround the vertical stack up configuration 704 above the vertical location of the first patch radiator 602.

Figure 9:
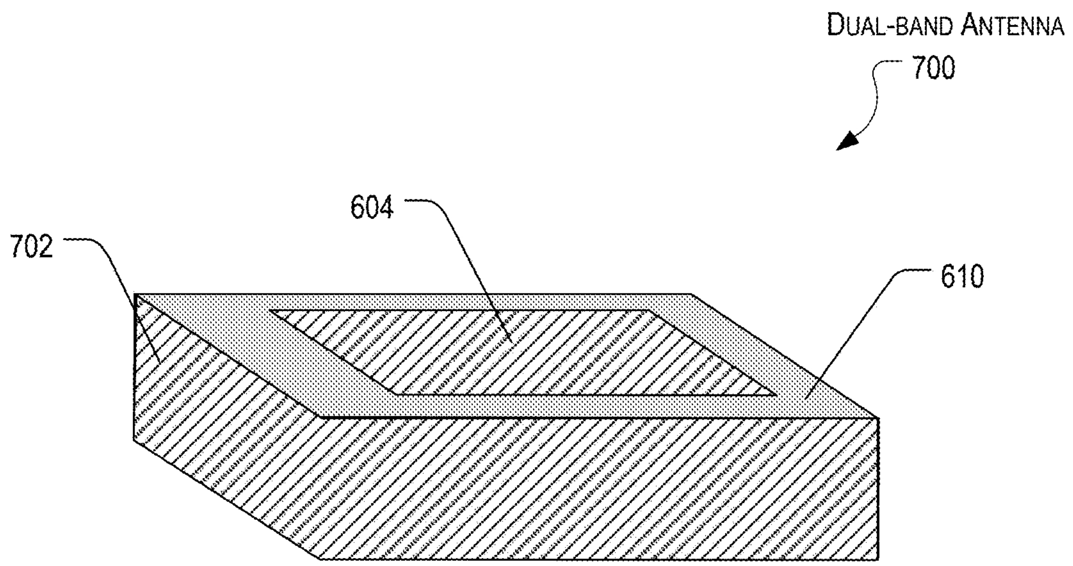
FIG. 9 is an isometric view of the dual-band antenna shown in FIG. 6 utilizing a conductive vertical surface that covers the entire vertical stack up configuration of the dual-band antenna.
Figure 10:
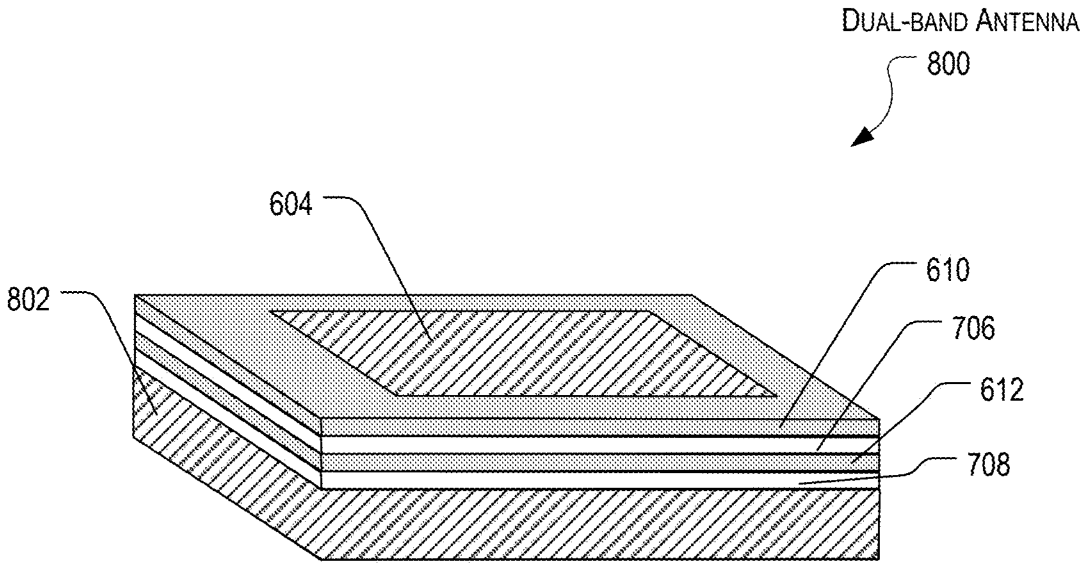
FIG. 10 is an isometric view of the dual-band antenna shown in FIG. 6 utilizing a conductive vertical surface that covers a first patch radiator within the vertical stack up configuration of the dual-band antenna.

FIG. 9 is an isometric view of the dual-band antenna 700 described in relation to FIG. 7 utilizing the conductive vertical surface 702 that covers the entire height of the vertical stack up configuration 704 of the dual-band antenna 700. FIG. 10 is an isometric view of the dual-band antenna 800 described in relation to FIG. 8 utilizing the conductive vertical surface 802 that covers the first patch radiator 602 within the vertical stack up configuration 704 of the dual-band antenna 800.

Figure 11:
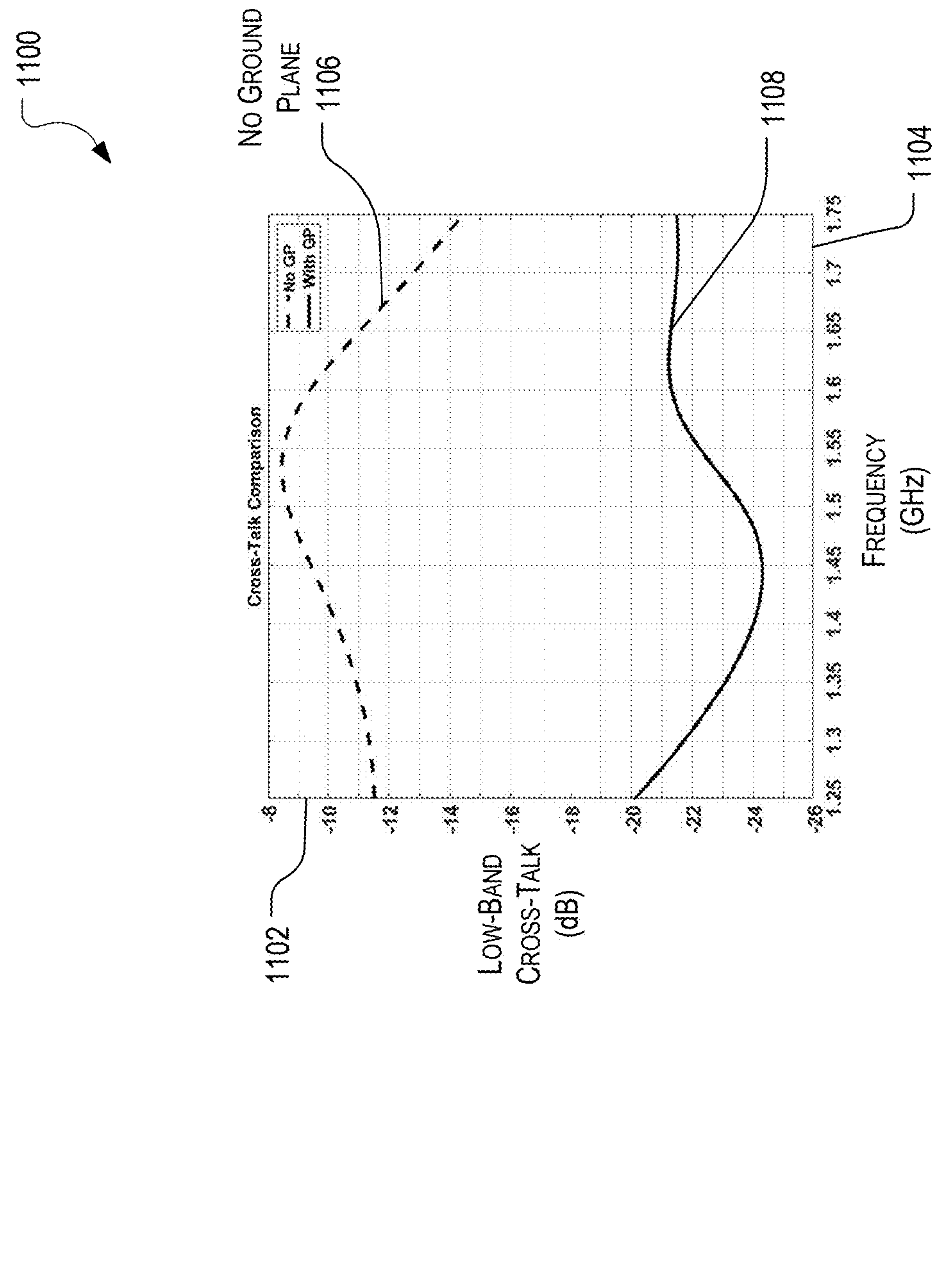
FIG. 11 is a plot of the cross-talk versus frequency for dual-band antenna compared to another antenna that does not have the ground plane between the first patch radiator and the second patch radiator.

FIG. 11 is a graph 1100 of the cross-talk 1102 versus frequency 1104 for dual-band antenna such as, for example, dual-band antenna 100, compared to another antenna that does not have the ground plane 106 between the first patch radiator 102 and the second patch radiator 104. The first plot 1106 represents the cross-talk 1102 versus frequency 1104 of the antenna that does not have the ground plane 106. The second plot 1108 represents the cross-talk 1102 versus frequency 1104 of the dual-band antenna 100. In this example, the dual-band antenna 100 is shown to have an approximate 14.63 dB improvement at approximately 1.51 GHz as compared to the antenna that does not have the ground plane 106. In this example, the first plot 1106 represents the cross-talk versus frequency 1104 of the antenna that does not have the ground plane 106.

Figure 12:
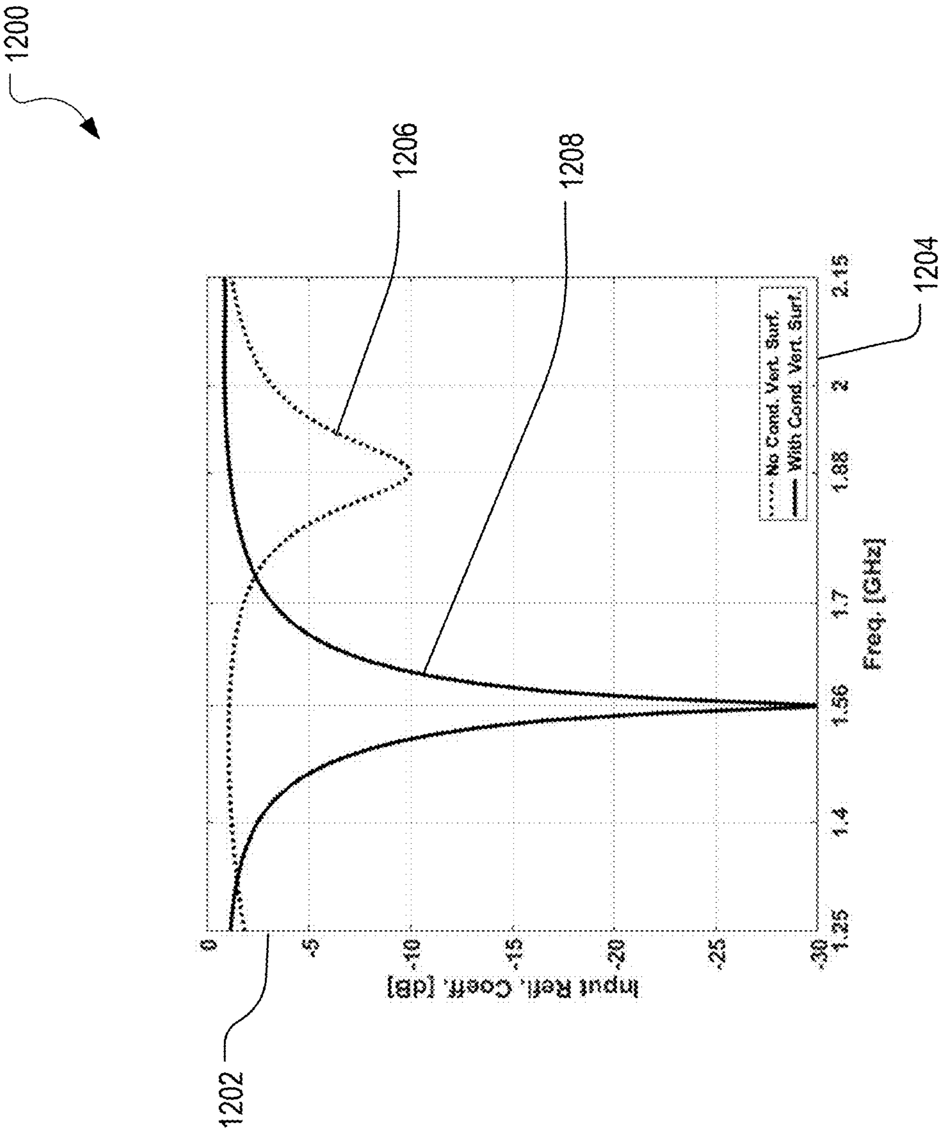
FIG. 12 is a plot of the reflection coefficient versus frequency for dual-band antenna compared to another antenna that does not have the conductive vertical surface in proximity to the feeding signal paths of the first patch radiator.

FIG. 12 is a graph 1200 of the reflection coefficient 1202 versus frequency 1204 for dual-band antenna such as, for example, dual-band antenna 100, compared to another antenna that does not have the conductive vertical surface 108 in proximity to the feeding signal paths (i.e., first signal path 118 and second signal path 120) of the first patch radiator 102 and the radiator itself.

The first plot 1206 represents the reflection coefficient 1202 versus frequency 1204 of the antenna that does not have the conductive vertical surface 108. The second plot 1208 represents the reflection coefficient 1202 versus frequency 1204 of the dual-band antenna 100. In this example, the dual-band antenna 100 is shown to have an approximate bandwidth shift downward of approximately 17% from 1.880 GHz (for the antenna without the conductive vertical surface 108) down to 1.56 GHz.

Figure 13:
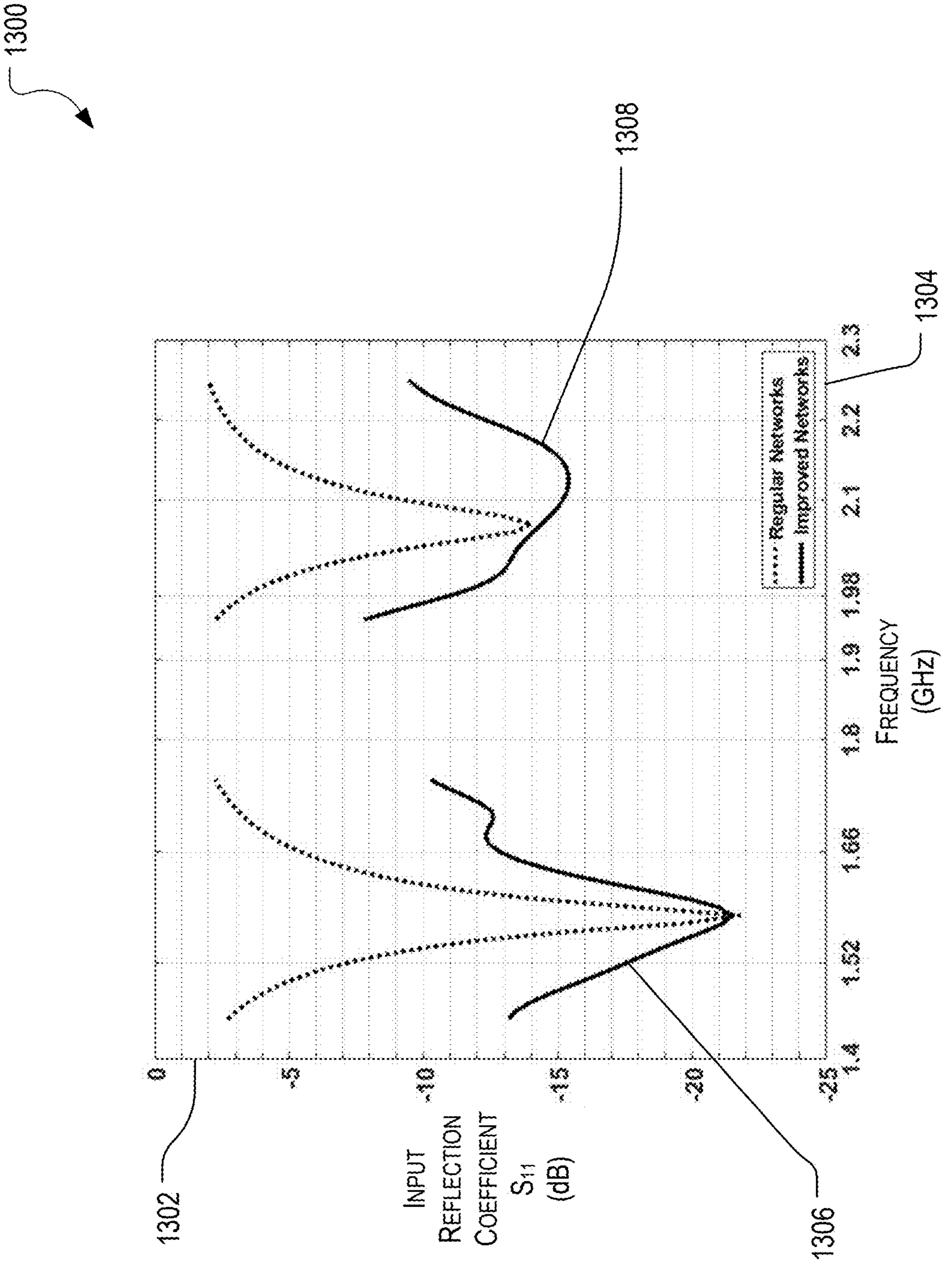
FIG. 13 is a plot of the reflection coefficient versus frequency for the first feed network and second feed network.

FIG. 13 is a graph 1300 of the reflection coefficient 1302 versus frequency 1304 for the first feed network 110 and second feed network 112. The first plot 1306 shows an improvement of approximately 10 dB in the reflection coefficient 1302 for first feed network 110 operating between 1.52 GHz and 1.66 GHz and the second plot 1308 shows an improvement of approximately 7.6 dB in the reflection coefficient 1302 for the second feed network 112 operation between 1.98 GHz and 2.2. GHz.

FIG. 15 is another top view of an example of an implementation of the dual-band antenna 1500 shown in FIGS. 1, 3, 4, 6-10, and 14 with example dimension values. In this view, the vertical stack up configuration 114 is shown as having a bottom ground plane 1502, a first patch radiator 1504, a second patch radiator 1506, and a ground plane 1508. In this example, the ground plane 1508 is shown as with hidden lines because it is located below the second patch radiator 1506 within the vertical stack up configuration 114. As an example, the dual-band antenna 1500 may have a first center line 1510 along a first direction that is normal to the vertical stack up configuration 114 and second center line 1512 along a second direction that is also normal to the vertical stack up configuration 114. In this example, the bottom ground plane 1502 is shown to be rectangular in shape with sides 1514 that are approximately 75 millimeters (mm) long that is approximately equal to 0.375 times the wavelength ($\lambda_0$) of the center frequency of operation. The first patch radiator 1504 is shown to be rectangular in shape with sides 1516 that are approximately 65 mm long (i.e., approximately equal to $0.245\lambda_0$); the second patch radiator 1506 is shown to be rectangular in shape with sides 1518 that are approximately 49.3 mm long (i.e., approximately equal to $0.245\lambda_0$); and the ground plane 1508 is shown to be rectangular in shape with sides 1520 that are approximately 28.3 mm long (i.e., approximately equal to $0.14\lambda_0$). In these examples, the center frequency of operation may be approximately equal to 1.56 GHz.

In this example, the bottom ground plane 1502, the first patch radiator 1504, and second patch radiator 1506 are shown to be centered along both the first center line 1510 and second center line 1512; and the ground plane 1508 is shown as offset in both the first direction along the first center line 1510 and the second direction along the second center line 1512. In this example, the conductive vertical surface (e.g., conductive vertical surface 108) is located along an edge of the perimeter 1522 of the bottom ground plane 1502, where an edge 1524 of the first patch radiator 1504 is in electrical proximity to the conductive vertical surface. As an example, the edge 1524 of the first patch radiator 1504 may be located at a first distance 1526 from the edge of the perimeter 1522 of the bottom ground plane 1502 that is approximately 5 mm (i.e., approximately equal to $0.025\lambda_0$); an edge 1528 of the second patch radiator 1506 may be located at second distance 1530 from the edge of the perimeter 1522 of the bottom ground plane 1502 that is approximately 10 mm (i.e., approximately equal to $0.05\lambda_0$); and the edge 1528 of the second patch radiator 1506 may also be located at third distance 1532 from the first center line 1510 that is approximately 24.65 mm (i.e., approximately equal to $0.1225\lambda_0$).

As another example, the ground plane 1508 is shown offset in both the first direction along the first center line 1510 and the second direction along the second center line 1512 such that a first edge 1534 of the ground plane 1508 is located at a fourth distance 1536 that is approximately 16.3 mm (i.e., approximately equal to $0.08\lambda_0$) from the first center line 1510 and a second edge 1538 of the ground plane 1508 is located at a fifth distance 1540 that is approximately 12 mm (i.e., approximately $0.06\lambda_0$) from the first center line 1510. In this example, the second edge 1538 of the ground plane 1508 is also located a sixth distance 1542 that is approximately 12.65 mm (i.e., approximately $0.063\lambda_0$) from the edge 1528 of the second patch radiator 1506. The ground plane 1508 also has a third edge 1544 that is located a seventh distance 1546 that is approximately 12 mm (i.e., approximately $0.06\lambda_0$) from the second center line 1512 and an eighth distance 1548 that is approximately 12.5 mm (i.e., approximately $0.063\lambda_0$) from the edge 1528 of the second patch radiator 1506. The ground plane 1508 also has a fourth edge 1550 that is located a nineth distance 1552 that is approximately 16.3 mm (i.e., approximately $0.08\lambda_0$) from the second center line 1512.

FIG. 16 is a side view of an example of an implementation of the dual-band antenna 1500 shown in FIGS. 1, 3, 4, 6-10, and 14-15 utilizing stacked layers of the vertical stack up configuration. In this example, the bottom ground plane 1502 may be overlaid on a first dielectric substate 1600, the first patch radiator 1504 may be overlaid on a second dielectric substrate 1602, and the second patch radiator 1506 may be overlaid on a third dielectric substrate 1604. There may be a first dielectric layer 1606 between the bottom ground plane 1502 and a second dielectric layer 1608 between the first patch radiator 1504 and the combination of the third dielectric substrate 1604 and ground plane 1508. In this example, the first dielectric substate 1600, the second dielectric substrate 1602, and the third dielectric substrate 1604 may be constructed of dielectric material such as, for example, FR4; and the first dielectric layer 1606 and second dielectric layer 1608 may be air. In this example, a first signal path 1610 and second signal path 1612 are shown that may be coaxial cables or vias as described previously.

In this example, the first dielectric substate 1600 may have a first thickness 1614 that is approximately 0.4 mm (i.e., approximately $0.0002\lambda_0$); the second dielectric substrate 1602 may have a second thickness 1616 that is approximately 1.5784 mm (i.e., approximately $0.0037\lambda_0$); and the third dielectric substrate 1604 may have a third thickness 1618 that is approximately 1.5784 mm (i.e., approximately $0.0037\lambda_0$). The first dielectric layer 1606 may have a fourth thickness 1620 that is approximately 6.5 mm (i.e., approximately $0.0325\lambda_0$) and second dielectric layer 1608 may have a fifth thickness 1622 that is approximately 5 mm (i.e., approximately $0.025\lambda_0$).

Other configurations may be implemented. For example, different dielectrics (with different dielectric constants) may be used in a stack up of patch radiators such that different patch radiators (e.g., the patch radiators 102, 104) may have the same, or approximately the same, size. As another example, more than one ground plane may be used in a radiator stack up. For example, an energy-coupling network (e.g., a feed network), or a portion thereof (e.g., a hybrid portion), may be disposed higher in the stack up than as discussed above. The energy-coupling network, or the portion thereof, may (for example) be disposed between levels of ground planes (e.g., between the ground planes, e.g., that drive an upper patch). As another example, energy couplers may not be directly connected to a signal source, e.g., being capacitively fed.

IMPLEMENTATION EXAMPLES

Implementation examples are provided in the following numbered clauses.

Clause 1. A dual-band antenna comprising:

a first patch radiator configured to operate at a first frequency band and a first polarization;

a second patch radiator configured to operate at a second frequency band and a second polarization that is orthogonal to the first polarization, wherein the second patch radiator overlays the first patch radiator in a stack up configuration and the first frequency band is a lower frequency band than the second frequency band;

a first ground plane positioned between the first patch radiator and the second patch radiator within the stack up configuration;

a first energy coupler having a first signal path and a second signal path, wherein both the first signal path and the second signal path are electrically coupled to a first coupling portion of the first patch radiator;

a second energy coupler having a third signal path and a fourth signal path, wherein both the third signal path and the fourth signal path are electrically coupled to a second coupling portion of the second patch radiator; and a conductive wall along the stack up configuration, wherein the conductive wall is in electrical proximity to the first patch radiator, the first signal path, and the second signal path.

Clause 2. The dual-band antenna of clause 1, wherein the first signal path is electrically coupled to the first coupling portion at a first electrical connection point located at a first location that is offset from a first center position of the first coupling portion in a first offset direction, the second signal path is electrically coupled to the first coupling portion at a second electrical connection point located at a second location that is offset from the first center position of the first coupling portion in a second offset direction, wherein the second offset direction is opposite the first offset direction, the first energy coupler further includes a first signal coupling path and a second signal coupling path that is longer than the first signal coupling path and is configured to produce an electrical ninety (90) degree phase shift in the second signal coupling path compared to the first signal coupling path, the first signal coupling path is electrically coupled to the first signal path, and the second signal coupling path is electrically coupled to the second signal path.

Clause 3. The dual-band antenna of either clause 1 or clause 2, wherein the first energy coupler includes a first meandered hybrid coupler with one or more first matching stubs.

Clause 4. The dual-band antenna of any of clauses 1-3, wherein the third signal path is electrically coupled to the second coupling portion at a third electrical connection point located at a third location, that is offset from a third center position of the second coupling portion in a third offset direction, the fourth signal path is electrically coupled to the second coupling portion at a fourth electrical connection point located at a fourth location that is offset from the third center position of the second coupling portion in a fourth offset direction, wherein the fourth offset direction is opposite the third offset direction, the second energy coupler further includes a third signal coupling path and a fourth signal coupling path that is longer than the third signal coupling path and is configured to produce an electrical ninety (90) degree phase shift in the fourth signal coupling path compared to the third signal coupling path, the third signal coupling path is electrically coupled to the third signal path, and the fourth signal coupling path is electrically coupled to the fourth signal path.

Clause 5. The dual-band antenna of any of clauses 1-4, wherein the second energy coupler includes a second meandered hybrid coupler with one or more second matching stubs.

Clause 6. The dual-band antenna of any of clauses 1-5, wherein the second patch radiator has a second patch radiator surface area that is smaller than a first patch radiator surface area.

Clause 7. The dual-band antenna of clause 6, wherein the first ground plane has a ground plane surface area that is smaller than the second patch radiator surface area.

Clause 8. The dual-band antenna of any of clauses 1-7, wherein the second coupling portion of the second patch radiator is located opposite a location of the first coupling portion of the first patch radiator relative to a center of the stack up configuration.

Clause 9. The dual-band antenna of any of clauses 1-8, wherein the first patch radiator and the second patch radiator are rectangular patch radiators.

Clause 10. The dual-band antenna of any of clauses 1-9, further including a second ground plane positioned below the first patch radiator, wherein the second ground plane is electrically coupled to the first ground plane.

Clause 11. The dual-band antenna of any of clauses 1-10, wherein the conductive wall surrounds the first patch radiator along a perimeter of the stack up configuration.

Clause 12. The dual-band antenna of any of clauses 1-11, wherein the conductive wall surrounds a perimeter of the stack up configuration.

Clause 13. The dual-band antenna of any of clauses 1-12, wherein the conductive wall is electrically coupled to the second ground plane.

Clause 14. The dual-band antenna of any of clauses 1-13, further including a dielectric, wherein the first patch radiator, the second patch radiator, and the first ground plane are stacked up above the second ground plane within the dielectric.

Clause 15. The dual-band antenna of any of clauses 1-14, further including a second ground plane positioned below the first patch radiator, wherein the second ground plane is electrically coupled to the first ground plane, the first energy coupler and the second energy coupler are located below the second ground plane, the first energy coupler is configured to drive the first patch radiator to radiate a first signal in the first frequency band and with the first polarization, the second energy coupler is configured to drive the second patch radiator to radiate a second signal in the second frequency band and with the second polarization, the first polarization is a first circular polarization, and the second polarization is a second circular polarization that is orthogonal to the first circular polarization.

Clause 16. The dual-band antenna of any of clauses 1-15, wherein the first energy coupler includes a first meandered hybrid coupler with one or more first matching stubs, and the second energy coupler includes a second meandered hybrid coupler with one or more second matching stubs.

Clause 17. A dual-band antenna comprising:

a first patch radiator configured to operate at a first frequency band and a first polarization;

a second patch radiator configured to operate at a second frequency band and a second polarization that is orthogonal to the first polarization, wherein the second patch radiator overlays the first patch radiator in a stack up configuration and the first frequency band is lower than the second frequency band;

means for lowering cross-talk between the first patch radiator and the second patch radiator within the stack up configuration;

means for exciting the first patch radiator at the first frequency band and the first polarization;

means for exciting the second patch radiator at the second frequency band and the second polarization; and means for lowering the first frequency band of the first patch radiator.

Clause 18. The dual-band antenna of clause 17, wherein the means for lowering the cross-talk includes a ground plane positioned between the first patch radiator and the second patch radiator within the stack up configuration, the second patch radiator has a surface area that is smaller than a surface area of the first patch radiator, and the ground plane has a surface area that is smaller than the surface area of the second patch radiator.

Clause 19. The dual-band antenna of either of clause 17 or clause 18, wherein the means for lowering the first frequency band of the first patch radiator includes a conductive wall along the stack up configuration, wherein the conductive wall is in electrical proximity to the first patch radiator and the means for driving the first patch radiator.

Clause 20. The dual-band antenna of any of clauses 17-19, further including a bottom ground plane positioned below the first patch radiator, wherein the bottom ground plane is electrically coupled to the means for lowering cross-talk.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms “a,” “an,” and “the” include the plural forms as well, unless the context clearly indicates otherwise. Thus, reference to a device in the singular (e.g., “a device,” “the device”), including in the claims, includes at least one, i.e., one or more, of such devices (e.g., “a processor” includes at least one processor (e.g., one processor, two processors, etc.), “the processor” includes at least one processor, “a memory” includes at least one memory, “the memory” includes at least one memory, etc.). The phrases “at least one” and “one or more” are used interchangeably and such that “at least one” referred-to object and “one or more” referred-to objects include implementations that have one referred-to object and implementations that have multiple referred-to objects. For example, “at least one processor” and “one or more processors” each includes implementations that have one processor and implementations that have multiple processors.

The terms “comprises,” “comprising,” “includes,” and/or “including,” as used herein, specify the presence of stated features, integers, steps, operations, elements, and/or components, but do not preclude the presence or addition of one or more other features, integers, steps, operations, elements, components, and/or groups thereof.

Also, as used herein, “or” as used in a list of items (possibly prefaced by “at least one of” or prefaced by “one or more of”) indicates a disjunctive list such that, for example, a list of “at least one of A, B, or C,” or a list of “one or more of A, B, or C” or a list of “A or B or C” means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of “a processor configured to measure at least one of A or B” or “a processor configured to measure A or measure B” means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of “a processor configured to at least one of measure X or measure Y” means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is “based on” an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A dual-band antenna comprising:

a first patch radiator configured to operate at a first frequency band and a first polarization;

a second patch radiator configured to operate at a second frequency band and a second polarization that is orthogonal to the first polarization, wherein the second patch radiator overlays the first patch radiator in a stack up configuration and the first frequency band is a lower frequency band than the second frequency band;

a first ground plane positioned between the first patch radiator and the second patch radiator within the stack up configuration;

a first energy coupler having a first signal path and a second signal path, wherein both the first signal path and the second signal path are electrically coupled to a first coupling portion of the first patch radiator;

a second energy coupler having a third signal path and a fourth signal path, wherein both the third signal path and the fourth signal path are electrically coupled to a second coupling portion of the second patch radiator; and a conductive wall along the stack up configuration, wherein the conductive wall is in electrical proximity to the first patch radiator, the first signal path, and the second signal path.

2. The dual-band antenna of claim 1, wherein the first signal path is electrically coupled to the first coupling portion at a first electrical connection point located at a first location that is offset from a first center position of the first coupling portion in a first offset direction, the second signal path is electrically coupled to the first coupling portion at a second electrical connection point located at a second location that is offset from the first center position of the first coupling portion in a second offset direction, wherein the second offset direction is opposite the first offset direction, the first energy coupler further includes a first signal coupling path and a second signal coupling path that is longer than the first signal coupling path and is configured to produce an electrical ninety (90) degree phase shift in the second signal coupling path compared to the first signal coupling path, the first signal coupling path is electrically coupled to the first signal path, and the second signal coupling path is electrically coupled to the second signal path.

3. The dual-band antenna of claim 2, wherein the first energy coupler includes a first meandered hybrid coupler with one or more first matching stubs.

4. The dual-band antenna of claim 2, wherein the third signal path is electrically coupled to the second coupling portion at a third electrical connection point located at a third location, that is offset from a third center position of the second coupling portion in a third offset direction, the fourth signal path is electrically coupled to the second coupling portion at a fourth electrical connection point located at a fourth location that is offset from the third center position of the second coupling portion in a fourth offset direction, wherein the fourth offset direction is opposite the third offset direction, the second energy coupler further includes a third signal coupling path and a fourth signal coupling path that is longer than the third signal coupling path and is configured to produce an electrical ninety (90) degree phase shift in the fourth signal coupling path compared to the third signal coupling path, the third signal coupling path is electrically coupled to the third signal path, and the fourth signal coupling path is electrically coupled to the fourth signal path.

5. The dual-band antenna of claim 4, wherein the second energy coupler includes a second meandered hybrid coupler with one or more second matching stubs.

6. The dual-band antenna of claim 1, wherein the second patch radiator has a second patch radiator surface area that is smaller than a first patch radiator surface area.

7. The dual-band antenna of claim 6, wherein the first ground plane has a ground plane surface area that is smaller than the second patch radiator surface area.

8. The dual-band antenna of claim 1, wherein the second coupling portion of the second patch radiator is located opposite a location of the first coupling portion of the first patch radiator relative to a center of the stack up configuration.

9. The dual-band antenna of claim 8, wherein the first patch radiator and the second patch radiator are rectangular patch radiators.

10. The dual-band antenna of claim 1, further including a second ground plane positioned below the first patch radiator, wherein the second ground plane is electrically coupled to the first ground plane.

11. The dual-band antenna of claim 10, wherein the conductive wall surrounds the first patch radiator along a perimeter of the stack up configuration.

12. The dual-band antenna of claim 10, wherein the conductive wall surrounds a perimeter of the stack up configuration.

13. The dual-band antenna of claim 10, wherein the conductive wall is electrically coupled to the second ground plane.

14. The dual-band antenna of claim 10, further including a dielectric, wherein the first patch radiator, the second patch radiator, and the first ground plane are stacked up above the second ground plane within the dielectric.

15. The dual-band antenna of claim 1, further including a second ground plane positioned below the first patch radiator, wherein the second ground plane is electrically coupled to the first ground plane, the first energy coupler and the second energy coupler are located below the second ground plane, the first energy coupler is configured to drive the first patch radiator to radiate a first signal in the first frequency band and with the first polarization, the second energy coupler is configured to drive the second patch radiator to radiate a second signal in the second frequency band and with the second polarization, the first polarization is a first circular polarization, and the second polarization is a second circular polarization that is orthogonal to the first circular polarization.

16. The dual-band antenna of claim 15, wherein the first energy coupler includes a first meandered hybrid coupler with one or more first matching stubs, and the second energy coupler includes a second meandered hybrid coupler with one or more second matching stubs.

17. A dual-band antenna comprising:

a first patch radiator configured to operate at a first frequency band and a first polarization;

a second patch radiator configured to operate at a second frequency band and a second polarization that is orthogonal to the first polarization, wherein the second patch radiator overlays the first patch radiator in a stack up configuration and the first frequency band is lower than the second frequency band;

means for lowering cross-talk between the first patch radiator and the second patch radiator within the stack up configuration;

means for exciting the first patch radiator at the first frequency band and the first polarization;

means for exciting the second patch radiator at the second frequency band and the second polarization; and means for lowering the first frequency band of the first patch radiator.

18. The dual-band antenna of claim 17, wherein the means for lowering the cross-talk includes a ground plane positioned between the first patch radiator and the second patch radiator within the stack up configuration, the second patch radiator has a surface area that is smaller than a surface area of the first patch radiator, and the ground plane has a surface area that is smaller than the surface area of the second patch radiator.

19. The dual-band antenna of claim 17, wherein the means for lowering the first frequency band of the first patch radiator includes a conductive wall along the stack up configuration, wherein the conductive wall is in electrical proximity to the first patch radiator and the means for driving the first patch radiator.

20. The dual-band antenna of claim 17, further including a bottom ground plane positioned below the first patch radiator, wherein the bottom ground plane is electrically coupled to the means for lowering cross-talk.

* * * * *